(12) United States Patent
Nishikawa

(10) Patent No.: US 6,532,415 B2
(45) Date of Patent: Mar. 11, 2003

(54) SIGHTSEEING GUIDE SYSTEM

(75) Inventor: Kumiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/765,377

(22) Filed: Jan. 22, 2001

(65) Prior Publication Data

US 2001/0018634 A1 Aug. 30, 2001

(30) Foreign Application Priority Data

Feb. 29, 2000 (JP) .................................... 2000-053288

(51) Int. Cl.[7] .............................. G08G 1/09; H04B 7/26
(52) U.S. Cl. ........................ 701/200; 701/23; 701/24; 701/1; 455/422; 455/457; 455/414; 340/991; 340/995; 340/907; 340/916; 395/205
(58) Field of Search ................................. 701/200, 201, 701/1, 207, 36, 23, 24; 455/456, 422, 457, 414; 340/905, 991, 993, 901, 995, 907, 916, 988, 990; 705/6; 379/60; 395/205

(56) References Cited

U.S. PATENT DOCUMENTS 5,235,633 A * 8/1993 Dennison et al. ............. 379/60
6,009,403 A * 12/1999 Sato ............................... 705/6
6,097,313 A * 8/2000 Takahashi et al. .......... 340/905
6,115,611 A * 9/2000 Kimoto et al. .............. 455/456
6,154,689 A * 11/2000 Pereira et al. ................ 701/1
6,167,255 A * 12/2000 Kennedy, III et al. ...... 455/414

* cited by examiner

Primary Examiner—Thomas G. Black
Assistant Examiner—Tuan C To
(74) Attorney, Agent, or Firm—Staas & Halsey LLP

(57) ABSTRACT

A sightseeing guide system has IS (Informed Source) terminals respectively mounted in an IS vehicle, which includes a sub-storage unit stored with local information consisting of sightseeing information and shop information, a radio communication device for performing IVC-based communications with a PT (Personal Terminal) vehicle, and a processing unit. A personal terminal (PT) mounted in the PT vehicle includes a radio communication device for performing the IVC-based communications with the IS terminal, a processing unit, and an I/O unit for displaying the information received via the radio communication device. The processing unit of the IS terminal transmits segments about a periphery of a present position of the IS vehicle, of the local information stored in the sub-storage unit, to the PT via the radio communication device at a predetermined timing or in response to a request give from the PT.

28 Claims, 19 Drawing Sheets

Fig. 4

| KEY ID | NAME OF CUSTOMER | AGE | CAR NUMBER | CAR TYPE | SERVICE | DESTINATION | METHOD OF PAYMENT | ON-SERVICE | CONTENT OF CONTRACT | ACCUMULATION BOX |
|---|---|---|---|---|---|---|---|---|---|---|
| | | | | | COMMON/INDIVIDUAL/OTHERS | ·FREE<br>·FROM __ TO __ | CASH/CREDIT | YES/NO | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

SIGHTSEEING GUIDE SYSTEM

BACKGROUND OF THE INVENTION

1. Field of the Invention

The present invention relates to a sightseeing guide system utilizing IVC (Inter Vehicle Communications) in ITS (Intelligent Transport System). The present disclosure relates to subject matter contained in Japanese Patent Application No. 2000-053288 (filed on Feb. 29, 2000), which is expressly incorporated herein by reference in its entirety.

2. Description of the Related Art

A type of a conventional sightseeing travel is roughly classified into a group travel and an individual trip. The group travel is that a travel company previously reserves necessary travel facilities such as transport facilities, sightseeing facilities, hotel facilities etc. for a predetermined number of travelers, and the plurality of travel participants utilize those facilities on the same itinerary. The individual trip is that the traveler himself or herself makes the arrangements for the transport facilities and hotel facilities or asks the travel company to make those arrangement and independently takes the sightseeing trip. In the case of the group travel, it is required that each group be accompanied with a tour conductor who guides the plurality of participants on the same itinerary and provides the respective participants with necessary services, such as a guide for sightseeing, making arrangements for packed lunches, giving information in emergency, etc. The individual trip also requires the sightseeing information e. g. in a guide book etc. as a guide for the traveler to take an independent action.

By the way, in the case of the group travel, a variety of services must be provided at any time to the respective participants. Therefore, the participation in the travel with a privately owned car is ruled out, and all the participants must get on a bus arranged by the travel company. For the same reason, if there a plurality of buses used for the group travel taking the same itinerary, a tour conductor must get on every bus.

Tremendous costs and expenditures must be, however, needed for training a prospective tour conductor till he or she is trained well enough to perform a variety of services. Further, even a long-experienced tour conductor also needs a study for acquiring knowledge about a new sightseeing spot when in charge of a group travel to this new sightseeing spot. Accordingly, it is not easy to increase and decrease the number of the tour conductors corresponding to an increase and a decrease in the number of travel participants (i.e., corresponding to an increase and a decrease in the number of the buses). Hence, there might be a case where the tour conductor does not necessarily get on each bus, and a case where no tour conductor, though it is a group travel, accompanies the group. In those cases, the services for the travel participants are not necessarily sufficient.

On the other hand, the tour conductor does not accompany the individual trip in principle, and therefore the traveler is unable to receive the variety of services.

It is, however, predicted that demands for the individual trips will rise with a diversification of the type of the sightseeing travel. Consequently, there arises a necessity for the travel company to provide the same various services as those for the group travel to the individual customer taking the individual trip in accordance with their likings. Further, a local sightseeing association etc at the sightseeing spot will have a possibility of inducing a great number of travelers, if able to introduce the hotel facilities, restaurants, souvenir shops etc in the local area to the travelers taking the individual trips.

SUMMARY OF THE INVENTION

It is a primary object of the present invention, which was devised under such circumstances, to provide a sightseeing guide system capable of providing a traveler with necessary services through a terminal device installed in a vehicle on which each traveler gets on by utilizing IVC in ITC.

To accomplish the above object, according to one aspect of the present invention, a sightseeing guide system includes an information source terminal mounted in an information source vehicle, and an information output terminal mounted in a customer vehicle which a customer gets on. The information source terminal has a storage unit stored with information, a first radio communication device, and a control unit for transmitting the information stored in the storage unit towards the information output terminal via the first radio communication device. The information output terminal includes a second radio communication device capable of performing radio communications with the first radio communication device of the information source terminal, an output unit for outputting the information in such a mode that the information is recognizable by the customer, and a control unit for outputting, via the output unit, the information received from the information source terminal via the second radio communication device.

According to the thus constructed sightseeing guide system, even if a tour conductor does not get on a customer vehicle, customers in the customer vehicle are able to access and know the information stored in the storage unit of the information source terminal mounted in the information source vehicle through the radio communications between the first radio communication device of the information source terminal and the second radio communication device of the information output terminal, by use of the output device of the information output terminal which outputs the information visually or in voice.

BRIEF DESCRIPTION OF THE DRAWINGS

The invention will be described in detail with reference to the accompanying drawings, in which:

FIG. 4 is a table showing a structure of a PT database;

DESCRIPTION OF THE PREFERRED EMBODIMENT

An embodiment of the present invention will hereinafter be described with reference to the accompanying drawings.

FIRST EMBODIMENT

Figure 1:
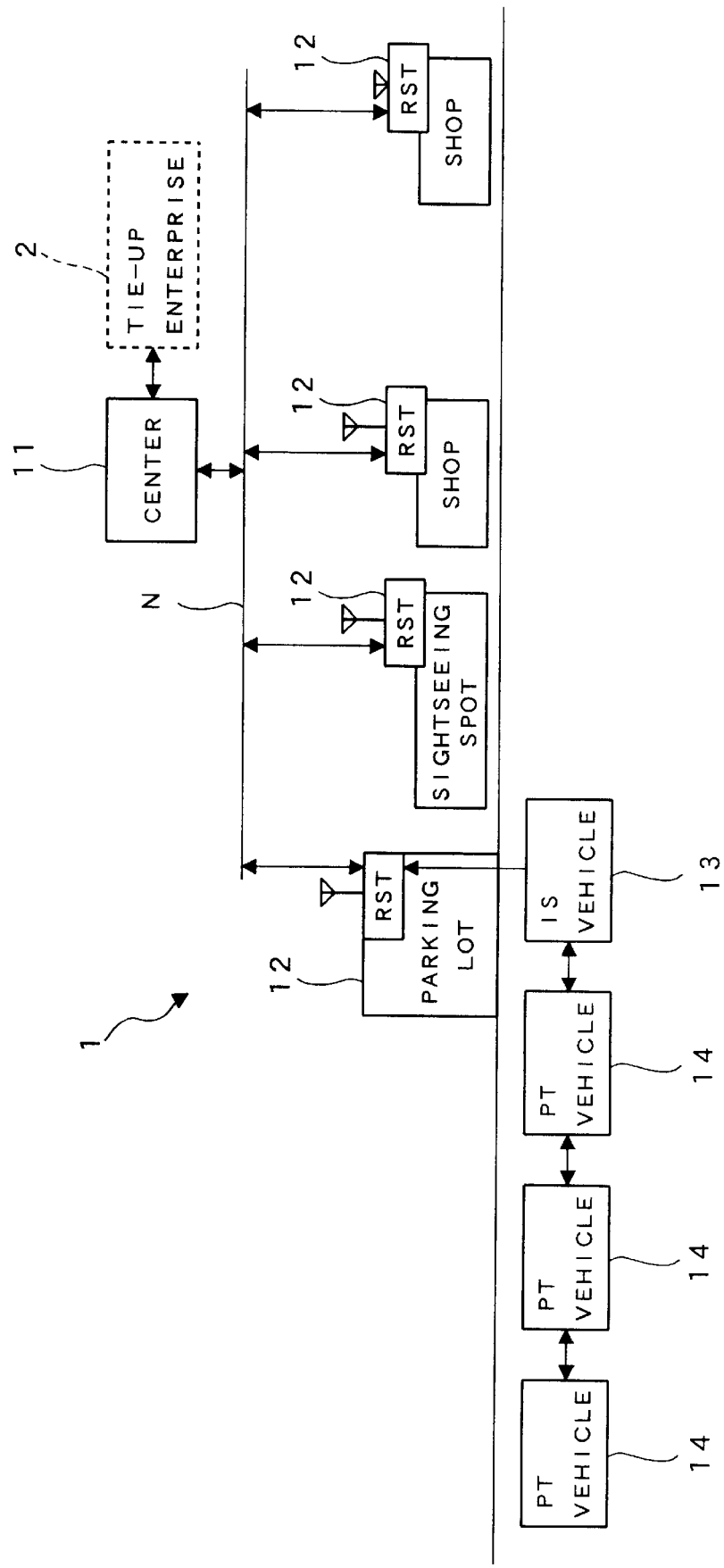
FIG. 1 is a block diagram showing an outline of an architecture of a sightseeing guide system in one embodiment of the present invention.
Figure 2:
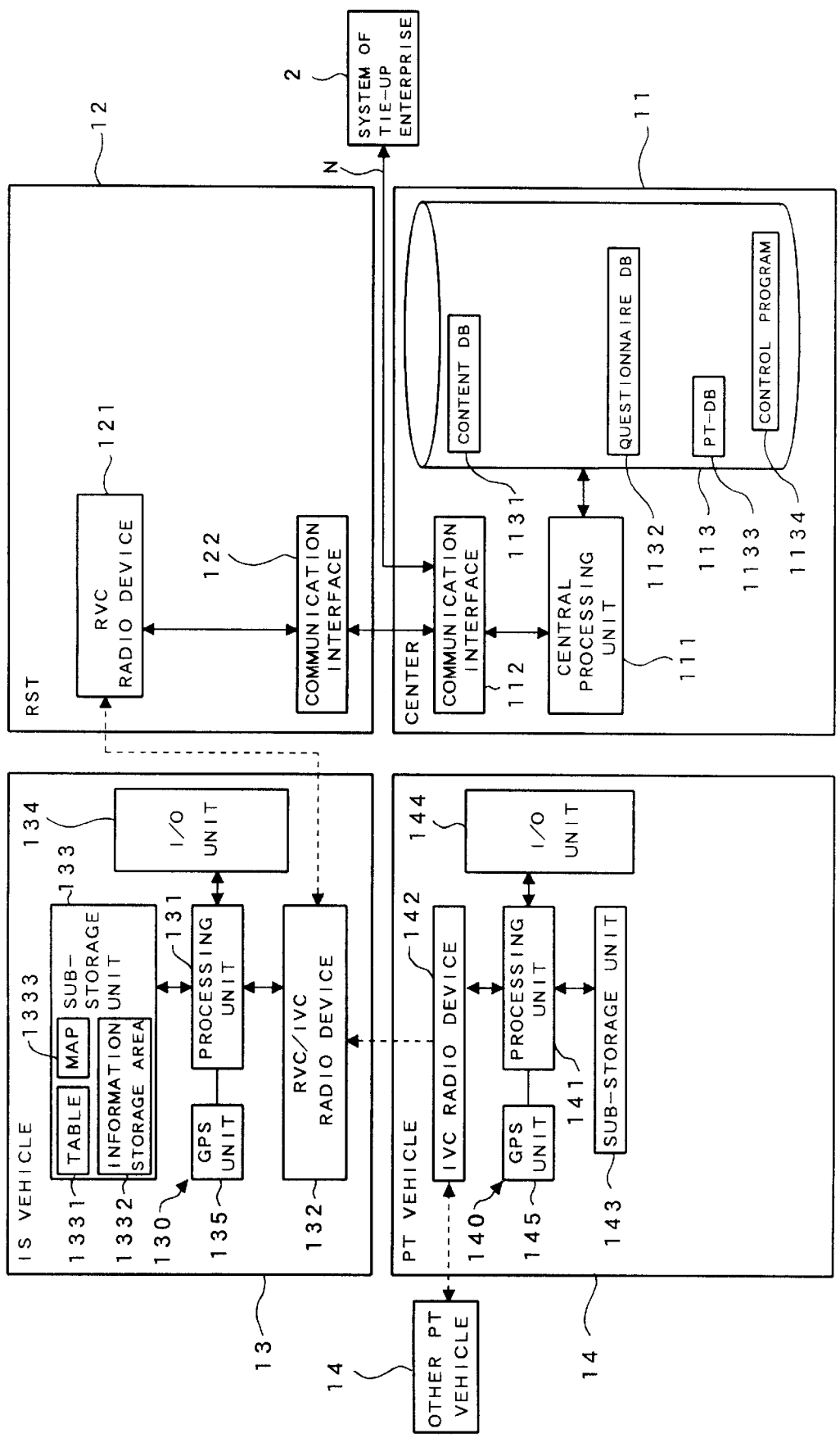
FIG. 2 is a block diagram showing circuit configurations of a center, an IS terminal in an IS vehicle and a PT (Personal Terminal) in a PT vehicle in FIG. 1.
Figure 3:
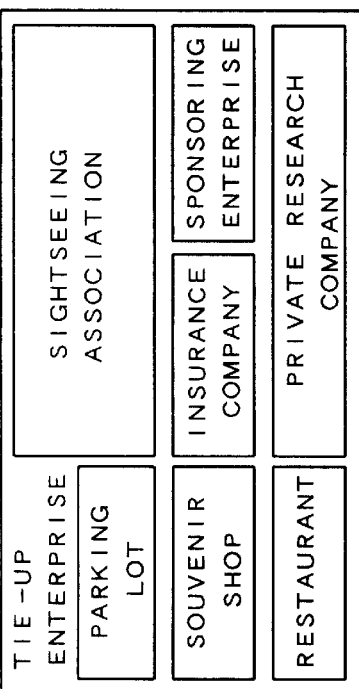
FIG. 3 is an explanatory diagram showing a mode of utilizing a sightseeing guide system.

Outline of Architecture of Sightseeing Guide System To start with, an outline of a sightseeing guide system in the first embodiment will be explained referring to FIGS. 1 through 3. FIG. 1 is a block diagram showing an outline of architecture of a sightseeing guide system 1. FIG. 2 is a block diagram showing an internal configuration of respective components (a PT vehicle 14, an S vehicle 13, an RST 12 and a center 11) in FIG. 1.

As illustrated in FIG. 1, this sightseeing guide system 1 is constructed of the center 11, a multiplicity of RSTs (Road Side Terminals) 12 connected to the center via a network N such as leased lines, public telephone lines etc, a plurality of IS vehicles (Information Source vehicles) 13 mounted with IS terminals (Informed Source terminals) 130 (see FIG. 2) which perform RVC (Road Vehicle Communications) with the respective RSTs, and a multiplicity of PT vehicles (customer vehicles) 14 mounted with PTs (Personal Terminals) 140 (see FIG. 2) for performing IVC (Inter Vehicle Communications) with the respective IS terminals 130.

The center 11 serving as central equipment is a server system. Only one server system is installed in an area covered by the sight seeing guide system 1 (which will hereinafter be called a "service area"). As shown in FIG. 2, the center 11 is constructed of a central processing unit 111 as a control unit, communication interfaces 112 each connected to this central processing unit 111, and a sub-storage unit 113 as a storage device. Further, in each of a plurality of districts into which the service area for the sightseeing guide system is divided, the RSTs 12 are fixedly installed at one or a plurality of selected places (such as a parking lot in a tourist facility, a parking lot of a souvenir shop, a station, etc) where the IS vehicles 13 frequently stop. Each. RST 12 is composed of an RVC radio device 121 and a communication interface 122. The RST 12 and the communication interface 112 of the center 11 configure a communication device capable of executing radio communications with the information source terminals via an antenna.

Further, the IS terminal 130 and the PT 140 are respectively constructed as a device having a function of the existing car navigation system. The IS terminal 130 as the information source terminal consists of a processing unit 131 as a control unit, and RVC/IVC radio devices 132, a sub-storage unit 133 as a storage device, an I/O unit 134, and GPS unit 135 as a position measuring device which are respectively connected to the processing unit 131. The PT 140 as an information output terminal is constructed of a processing unit 141 as a control unit, and IVS terminal devices 142 as second radio communication devices, a sub-storage unit 143, an I/O unit 144 as an output device and an input device, and a GSP unit 145 as a position measuring device which are respectively connected to the processing unit 141.

The communication interface 112 of the center 11 is a group of DSUs (Digital Service Units) (in the case of a digital line) or a group of MODEMs (in the case of an analog line), which is possible of one-to-many connections with the plurality of RSTs 12 and systems 2 of tie-up enterprises. The communication interface 112 receives information from the RST 12 and the system 2 of the tie-up enterprise, converts the information into a format in which the central processing unit 111 can process the information, and transfer the converted information to the central processing unit 111. The communication interface 112 also converts information transferred from the central processing unit 111 into a format in which the information can be distributed through within the network N in accordance with a command given from the central processing unit 111, and transmits the information to the RST 12 as a destination.

Figure 22:
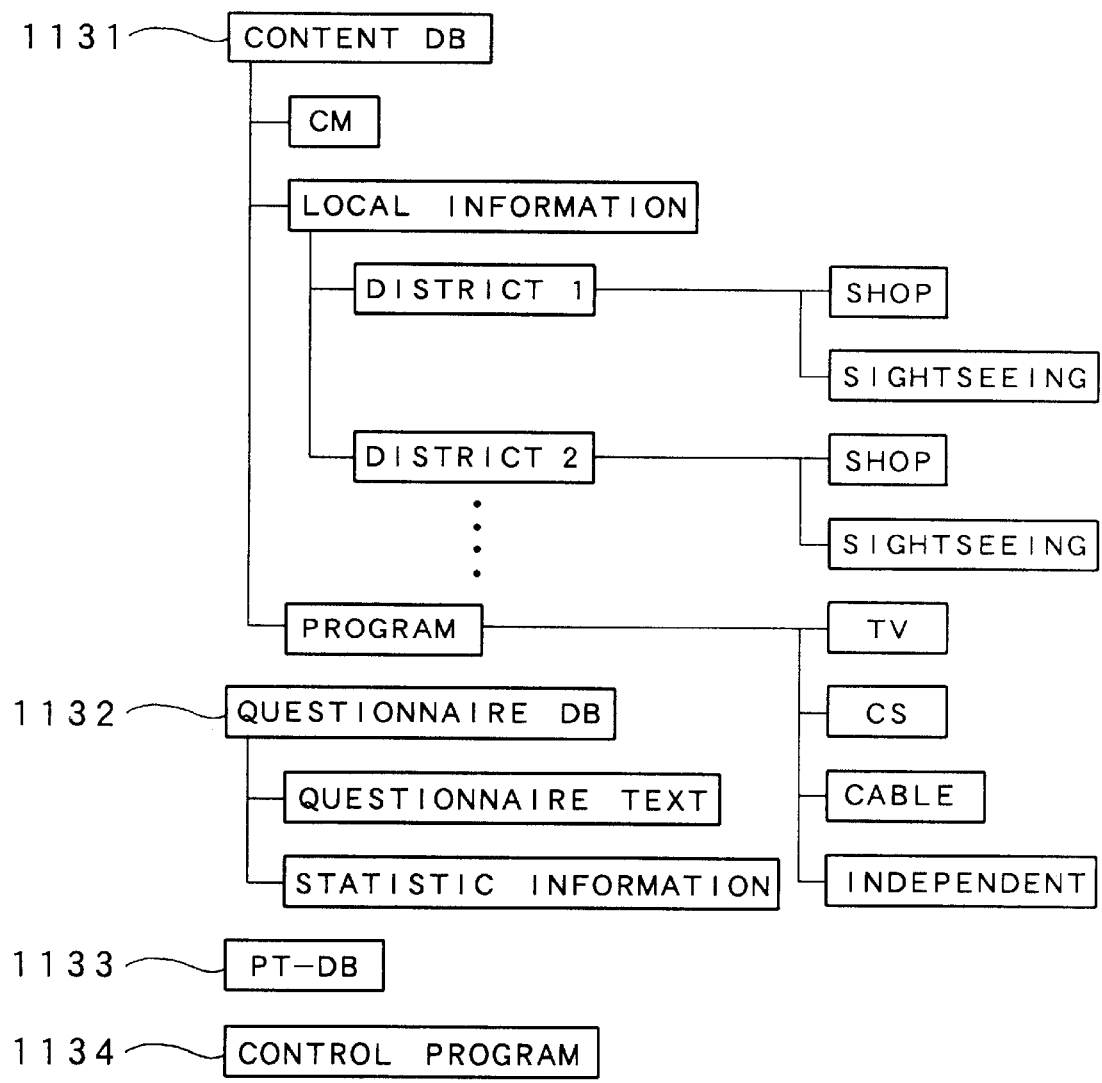
FIG. 22 is a diagram showing structures of databases and a control program in the sub-storage unit.

The sub-storage unit 113 is, as shown in FIG. 22, a hard disk device stored with a content database 1131, a questionnaire database 1132, a PT database 1133 and a control program 1134 executed by the CPU 111. The content database 1131 is a database in which pieces of information provided from the variety of tie-up enterprise systems 2 as shown in FIG. 3 are hierarchized. The content database 1131 roughly classified into three folders: a CM folder, a local information folder and a program folder. The CM folder is a folder for storing CM data (static image data or motion picture data) which are requested by a sponsoring enterprise giving a travel agent funds for operating the sightseeing guide system 1 to be broadcasted for advertisement. Further, the local information folder includes a subfolder for each district. The subfolder for every district further includes a shop subfolder stored with pieces of information on in-district shops (souvenir shops, restaurant, etc), and a sightseeing subfolder stored with sightseeing information of that district. The program folder is a folder stored with digitized data of TV broadcasting programs. The program folder includes a TV subfolder for storing data of grand wave broadcasting programs, a CS subfolder for storing data of satellite broadcasting programs, a cable subfolder for storing data of cable TV programs, and an independent subfolder for storing data of independently planned programs produced by the sightseeing guide system 1.

The questionnaire database 1132 consists of a questionnaire folder and a statistical information folder. The questionnaire folder is stored with questionnaires, which are requested by the sponsoring enterprise giving the funds to the travel agent operating the sightseeing guide system to be asked tourists. The statistical information folder is temporarily stored with answers (answer box) to the questionnaires.

The PT database 1133 is a database for storing information on customers (general tourists) who now utilize the sightseeing guide system 1 or utilized it in the past. To be specific, the PT database 1133 is, as shown in FIG. 4, stored per customer with a unique key ID (hereinafter called a "PT key") issued by the CPU 111 of the center 11 to every customer, a name and an age of the customer 4, a car number and a car type of a vehicle (PT vehicle 14) of the customer 4, and categories of the services provided to the customer 4 (which are a "common service" for transmitting information in a broadcasting type on the premise that the PT vehicle 14 of the customer 4 follows up the same IS vehicle 13, an "individual service" for transmitting and receiving information in a bidirectional type on the premise that the PT vehicle 14 of the customer 4 is capable of following up an arbitrary IS vehicle 13, and so on). The PT database 1133 is further stored with a travel destination in the services provided to the customer 4, a method of paying a fee for the sightseeing guide service chosen by the customer 4, contents of contract that prescribes a range of the information provided to the customer 4, on-service information showing whether the customer keeps receiving the sightseeing guide service or not, and individual information (accumulation BOX) about favorites etc of the customer 4.

The CPU 111 reads the control program 1134 from the sub-storage unit 113 and executes the same program. The CPU 111 thereby receives communication data from the respective IS vehicles 13 via the RSTs 12, as the necessity may arise, reads the information stored in any one of the databases in the sub-storage unit 113 to reply to the IS vehicles 13, and writes the information contained in the communication data given from the IS vehicle 13 to the corresponding database in the sub-storage unit 13. The content of processing by the CPU 111 will be explained in depth later on with reference to a flowchart.

The communication interface 122 of the RST 12 is a device that terminates the network N. The communication interface 122 transfers the information received from the center 11 via the network N to the RVC radio device 121, and transmits the information given from the RVC radio device 121 to the center 11 via the network N.

The RVC radio device 121 is a radio communication device for performing RVC-based radio communications with the RVC/IVC radio device 132 in the IS terminal 130 of the IS vehicle 13 entering an area in which the radio waves are reachable (which will hereinafter be called a "covering area"). A communication system used by the RVC radio device 121 for the RVC-based radio communications is DSRC (Dedicated Short Range Communication) or commercial-oriented DSRC. The RVC radio device 121 may be a base station of PDC (Personal Digital Cellular), PHS (Personal Handy-phone System), MCA (Multi-Channel Access) radio system etc, and may perform the communications with the RVC/IVC radio device 132 of the IS terminal 130 in each of the communication systems. Further, a medium usable by the RVC radio device 121 is not only the radio waves but also light beacons etc.

The RVC/IVC radio device 132 of the IS terminal 130 is constructed of a block (hereinafter termed an "RVC unit") serving as a third radio communication device for conducting the radio communications with the RVC radio device 121 of the RST 12, and a block (hereinafter called an "IVC unit") serving as a first radio communication device for performing the IVC-based radio communications with the IVC radio device 142 of the PT 140 of the PT vehicle 14 existing in the area (hereinafter called a "covering area" in which the radio waves are reachable. The RVC unit and the IVC unit may be constructed as an integral unit or as separate units. The RVC unit has the same function as that of the RVC radio device 121 of the RST 12. The radio waves used by the IVC unit for the IVC-based radio communications may be FM waves, millimeter waves, micro waves, and so forth.

The sub-storage unit 133 is a hard disk device or an optical disk device. The sub-storage unit 133 is stored with a table 1331 for registering the information on the PT 140 of the PT vehicle 14 existing in the covering area of the IS terminal 130, map information 1333, and a control program executed by the processing unit 131. The sub-storage unit 133 also includes an information storage area 1332 for storing the information received from the RST 12. The table 1331 is registered with the PT key, the car number of the PT vehicle 14, the category of the service provided to the customer 4 and the content of contract, for every PT vehicle 14 to which the IVC unit of the RVC/IVC radio device 132 transmits the radio waves. The information storage area 1332 is stored with the information (i.e., a part of the information in the content database 1131, and the questionnaires in the questionnaire database 1132) received from the center 11 via the RVC unit of the RVC/IVC radio device 132 and the RST 12. The map information 1333 is defined as data indicating a map in the service area.

The GPS unit 135 as the position measuring device detects the radio waves from GPS satellites, thereby inputting a signal indicating its present position to the processing unit 131.

The processing unit 131 reads and executes the control program in the sub-storage unit 133. The processing unit 133 thereby transmits a message to the center 11 via the RVC unit of the RVC/IVC radio device 132, and receives necessary pieces of information from the center 11 and stores the received information in the sub-storage unit 133. The processing unit 133 also broadcasts the information to the respective PT vehicles 14 existing in its covering area via the IVC unit of the RVC/IVC radio device 132 (when in a common service process). The processing unit 131 individually transmits and receives the information (when in an individual service process and in a service registration process), and controls the I/O unit 134 and other circuits. Further, the processing unit 131 generates a key indicating itself (hereinafter called an "IS key") and notifies a PT vehicle 14 to which the common service is provided and which exists in its covering area of the IS key. The content of processing by this processing unit 131 will be explained in details later on with reference to a flowchart. Note that the processing unit 131 recognizes the present position based on the signal inputted from the GPS unit 135, displays a map in the vicinity of the present position on a display of the I/O unit 134 on the basis of the map information 1333 and pinpoints the present position on this map.

The I/O unit 134 includes a liquid crystal display and an input device such as a touch panel and a keyboard. The I/O unit 134 codes characters inputted through the input device and inputs the coded data to the processing unit 131. Further, the I/O unit 134 displays image data (including the character data) given from the processing unit 131 on the liquid crystal display.

The IVC radio device 142 of the PT 140 is a device for executing the IVC-based radio communications with the IVC unit in the RVC/IVC radio device 132 of the IS terminal 13, and incorporates the same function as that of the IVC unit of the RVC/IVC radio device 132. Further, the IVC radio device 142 also has a function of relaying the communication data transferred between the IS terminal 13 and PTs 140 of other PT vehicles 14.

The sub-storage unit 143 is the hard disk device or the optical disk device for storing a control program executed by the processing unit 141 and the map information. The sub-storage unit 143 also stores its own PT key which the IS terminal 130 notifies of, the IS key of which the IS terminal 130 notifies when the PT vehicle 14 is provided with the common service, and the information (a part of local information etc.) received from the IS terminal 130.

The GPS unit 145 as the position measuring device detects the radio waves from the GPS satellites, and inputs a signal indicating its present position to the processing unit 141.

The processing unit 141 reads and executes the control program in the sub-storage unit 143. The processing unit 141 thereby transmits a message to the IS terminal 130 via the IVC radio device 142, and receives necessary pieces of information from the IS terminal 130 and stores the received information in the sub-storage unit 143. The processing unit 141 also control the I/O unit 144 and other circuits. The content of processing by this processing unit 141 will be explained in details later on with reference to a flowchart. Note that the processing unit 141 recognizes the present position based on the signal inputted from the GPS unit 145, displays a map in the vicinity of the present position on a display of the I/O unit 144 on the basis of the map information and pinpoints the present position on this map.

Figure 5:
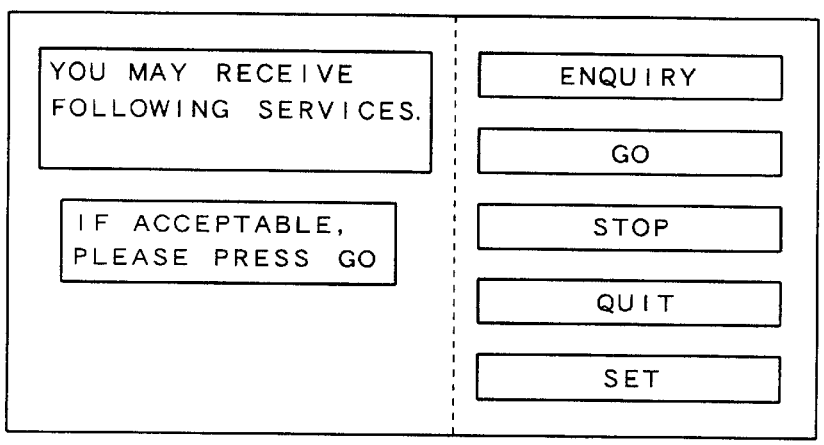
FIG. 5 is a diagram showing an initial screen displayed on a display of an I/O unit.
Figure 6:
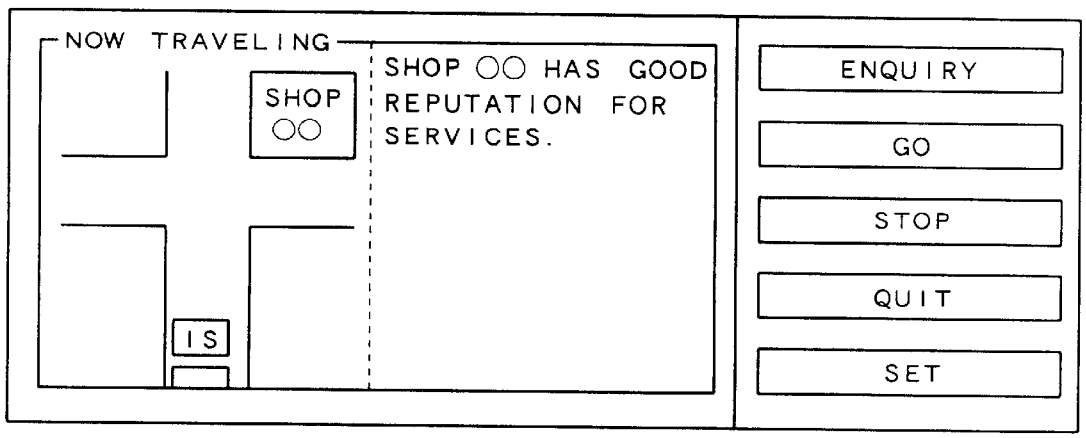
FIG. 6 is a diagram showing a screen on which CM information is displayed.
Figure 7:
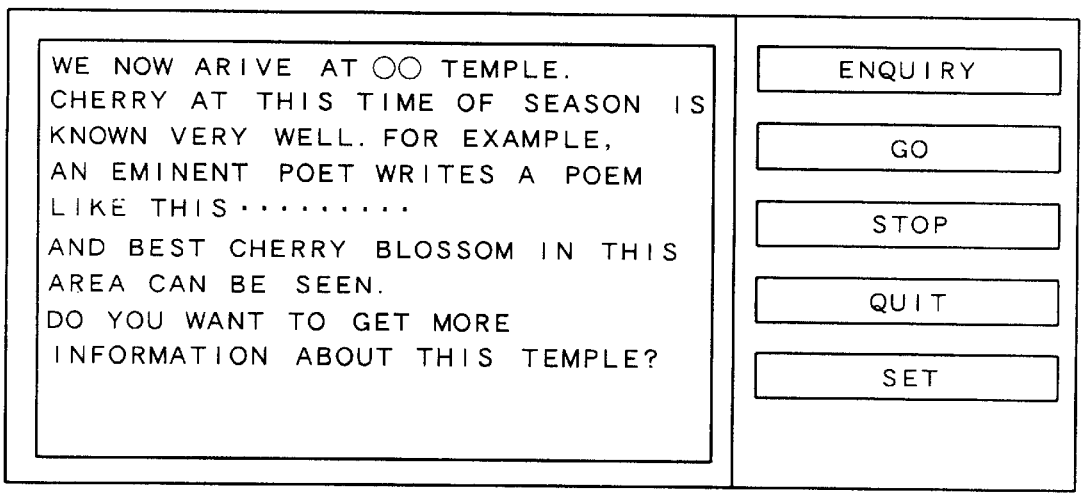
FIG. 7 is a diagram showing a screen on which peripheral information is displayed.

The I/O unit 144 includes a liquid crystal display and an input device such as a touch panel and a keyboard. The I/O unit 144 codes characters inputted through the input device and inputs the coded data to the processing unit 141. Further, the I/O unit 144 visually displays image data (including the character data) given from the processing unit 141 on the liquid crystal display. FIGS. 5 through 7 show examples of a screens displayed on the liquid crystal display of the I/O unit 144. As shown in FIGS. 5 through 7, five pieces of buttons (an "ENQUIRY" button , a "GO" button, a "STOP" button, an "QUIT" button, and a "SET" button) are displayed at the right side on this display. If a region of the touch panel overlapped with any one of these buttons is touched, the processing unit 141 recognizes such that a command corresponding to the button overlapping with the touched area is inputted.

Utilizing of Sightseeing Guide System

Next, an example of utilizing the sightseeing guide system 1 will be explained with reference to FIG. 3. Referring to FIG. 3, it is presumed that the sightseeing guide system 1 is operated by, e.g., a travel agent 3. However, it may be operated by a corporate body financed by a plurality of travel agents 3 and a local tourist association or other enterprises. In the latter case, the travel agents 3 entrust an implementation of the service to the operating body of the sightseeing guide system 1. The following discussion, however, will proceed on the assumption that a travel agent 3 itself operates the sightseeing guide system 1.

The travel agent 3, on the occasion of operating the sightseeing guide system 1, recruits the tie-up enterprises 2, such as a sponsoring enterprise that provides the funds as a collateral for making the customer 4 see the CM, an insurance company that provides the funds as a collateral for undertaking auto insurance on all the PT vehicles, a private research company that provides the funds as a collateral for having the questionnaires conducted to the customers 4, the local tourist association that provides the local information, souvenir shops, restaurants and parking lots which are in the service area. The travel agent 3 receives the funds and information provided from the tie-up enterprises. Further, the travel agent 3 mediates order information for reserving the parking lot, for ordering souvenirs, or for reserving the restaurant from the customer 4 via the sightseeing guide system 1, to the parking lot, the souvenir shop or the restaurant as the tie-up enterprises 2. The tie-up enterprise 2 that receives this piece of order information conducts the service corresponding to the order information when the customer 4 comes there. Further, the private research company, which obtained the customer information through the questionnaires, might deliver a novelty or a variety of notices to the customer 4 later on. Further, the sponsoring enterprise sends the CM information to the center 11 of the sightseeing guide system 1.

The customer 4 as the general tourist, at first, makes an application for the service to the travel agent 3, and pays a fee (a service fee) corresponding to that service. The services are, as explained above, roughly classified into the "common service" in which the customer 4 takes same actions as those of other participants throughout all the itineraries of a travel as in the case of the conventional group travel and the "individual service" in which the customer 4 receives information provided from the IS vehicle 13 proximal to the customer 4 while taking an arbitrary action as in the case of the conventional individual trip. The service fee is a total amount of fair charge for the service if no fund is provided by the tie-up enterprise 2. If this sort of fund is provided, however, the fee is an amount of money left by reducing the fund from the fair charge for the service, or free.

On the other hand, the travel agent 3 accepting the application for the service writes the information about the customer 4 into the PT database 1133 in the sub-storage unit 113 in the center 11 of the sightseeing guide system 1 on the basis of the customer information contained in the application for the service (however, the key ID is blank, and the on-service information=NO (off)). If the customer 4 utilizes the sightseeing guide system 2 second time or after, however, the information about the customer 4 has already been written to the PT database 1133, and therefore only some necessary items are rewritten. Further, the travel agent 3 lends a PT 140 to the customer 4. If the customer 4 has the same hardware as the PT 140, however, the travel agent 3 lends only a medium (an IC card etc) stored with the control program for making the hardware function as the PT 140.

During the trip, the customer 4, if provided with the individual service, inquires or orders the sightseeing guide system 1 about a variety of things, and answers to the questionnaire in response to the request from the sightseeing guide system 1. Further, the customer 4 receives the tour information and shop information provided from the sight seeing guide system 1 in a form corresponding to the category of the service.

Content of Processing

Figure 8:
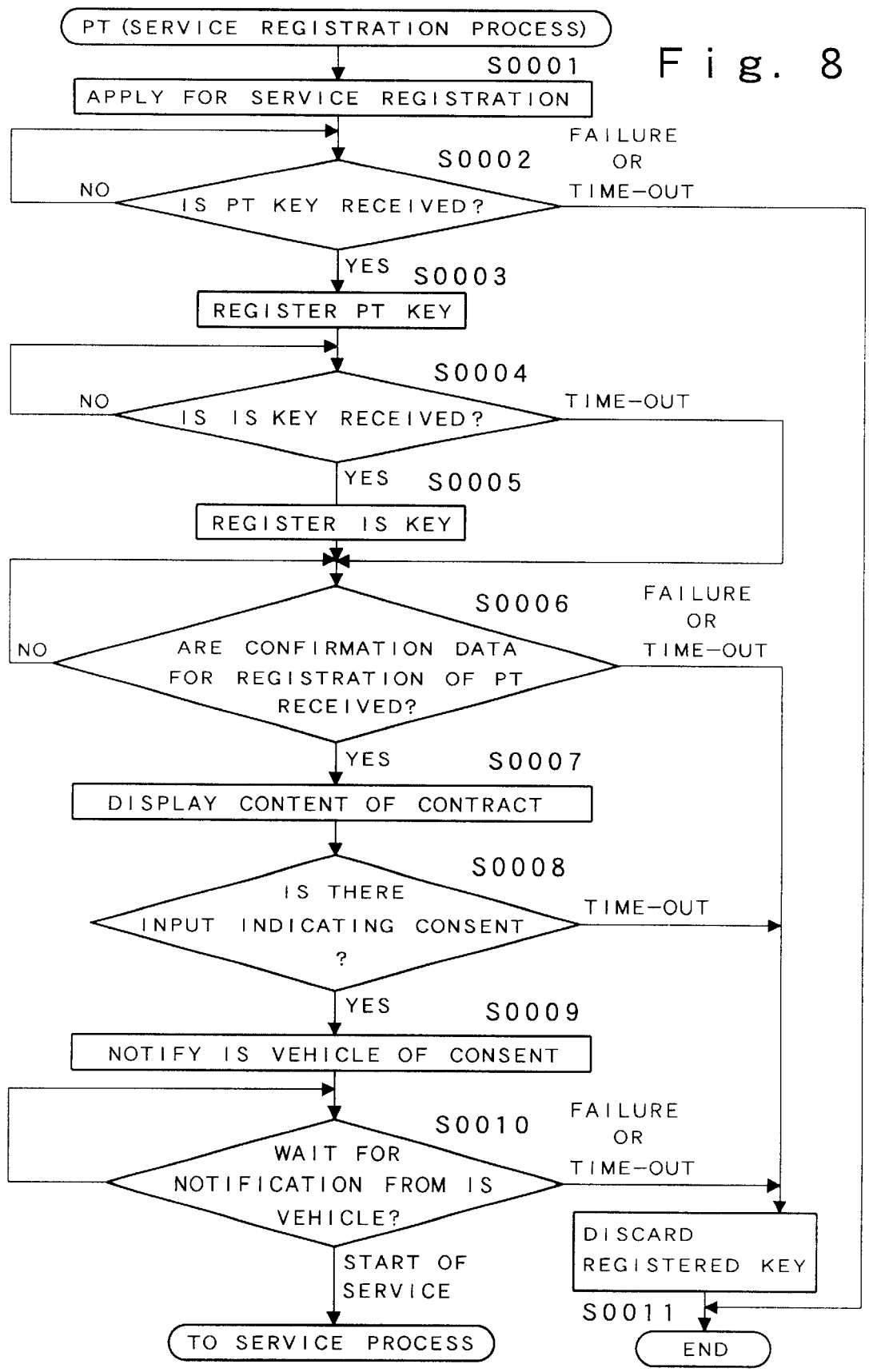
FIG. 8 is a flowchart showing a service registration process executed by a processing unit of the PT.

Next, the discussion will be made to the processes executed by the CPU 111 in accordance with the control program stored in the sub-storage unit 113 in the center 11 constructed in the way described above, the processes executed by the processing unit 131 in accordance with the control program stored in the sub-storage unit 133 in the IS terminal 130 and the processes executed by the processing unit 141 on the basis of the control program stored in the sub-storage unit 143 in the PT 140, with them separated into processes executed at service registration (which are the processes for registering a start of the service in the center 11 after the travel agent 3 has lent the PT 140 or the medium to the customer 4, and which will hereinafter be called "service registration processes"), and processes executed during the actual service (which will hereinafter be referred to as a "service processes"). Note that the PT 140 is provided the service provided after the service registered, so that the PT140 sequentially executes the service registration process shown in a flowchart in FIG. 8, and the common service process shown in a flowchart in FIG. 18 or the individual service process shown in flowcharts in FIGS. 19 and 20. On the other hand, the IS terminal 130 must communicate with the plurality of PTs 140 and therefore always executes the service process shown in the flowchart in FIG. 12. The IS terminal 130 further executes the service registration process shown in the flowcharts in FIGS. 9 and 10 as a parallel process each time any one of the PTs 140 applies for registering the service. Similarly, the center 11 must communicate with the plurality of IS terminals 130 and therefore always executes the service process shown in the flowchart in FIG. 21, and executes the service registration process shown in the flowchart in FIG. 11 as a parallel process each time any one of the IS terminals 130 applies for registering the service.

<Service Registration Process>
(Personal Terminal (PT))

The processing unit 141 of the PT 130, in an initial state, displays a screen for prompting a start of the service on the liquid crystal display of the I/O unit 144 as shown in FIG. 5. When the customer 4 depresses the "GO" button on this screen, the processing unit 141 starts the service registration process shown in FIG. 8. In first step S0001 after the start, the processing unit 141 makes an application for service registration to the IS vehicle 13 existing nearest with the identification information (i.e., the car number registered in the PT database 1133 shown in FIG. 4) specified.

In next step S0002, the processing unit 141 waits for a notification of a PT key from the IS vehicle 13. Then, if a PT key has not been notified for a predetermined time, or if an error massage has been notified within the predetermined time, the processing unit 141 quits this service registration process.

On the other hand, a PT key has been notified within the predetermined time, the processing unit 141 registers the notified PT key in the sub-storage unit 143.

In next S0004, the processing unit. 141 waits for a notification of an IS key from the IS vehicle 13. Then, if an IS key has not been notified for a predetermined time, i.e., when the category of the service registered in the PT database 1133 with respect to this PT vehicle 14 is "individual service", the processing unit 141 advances the processing directly to S0006. Whereas if an IS key has been notified from the IS vehicle 13, i.e., when the category of the service registered in the PT database 1133 with respect to this PT vehicle 14 is "common service", the processing unit 141 registers the notified IS key in the sub-storage unit 143 in S0005, and thereafter advances the processing to S0006.

In S0006, the processing unit 141 waits for receiving "confirmation data for registration of PT" from the IS vehicle 13. This piece of "confirmation data for registration of PT" is such data representing a content of the contract negotiated between the customer and the center 11 (viz., the travel agent 3). Then, if the "confirmation data for registration of PT" has not been notified for a predetermined time, or if an error massage has been notified from the IS vehicle 13, the processing unit 141 discards the keys (the PT key and the IS key) registered in the sub-storage unit 143 in S0011, and thereafter finishes this service registration process.

By contrast, when receiving the "confirmation data for registration of PT" from the IS vehicle 13 within the predetermined time, the processing unit 141 displays the contents of the contract on the display on the basis of the "confirmation data for registration of PT" in S0007.

In next step S0008, the processing unit 141 checks whether or not an intent of agreement is inputted by depressing the "GO" button on the screen. Then, if the "GO" button has not been depressed for a predetermined time, the processing unit 141 judges that the customer 4 refuses the content of the contract. The processing unit 141, in S0011, discards the keys (the PT key and the IS key) registered in the sub-storage unit 143, and thereafter quits this service registration process.

Whereas if the "GO" button is depressed within the predetermined time, the processing unit 141 judges that the customer 4 agreed to the content of the contract. The processing unit 141 notifies the IS vehicle 13 of the consent thereof in S0009.

In next step S0010, the processing unit 141 waits for a notification from the IS vehicle. Then, if notified of nothing for a predetermined time, or if notified of an error massage from the IS vehicle 13, the processing unit 141 discards the keys (the PT key and the IS key) registered in the sub-storage unit 143 in S0011, and thereafter finishes this service registration process.

Figure 18:
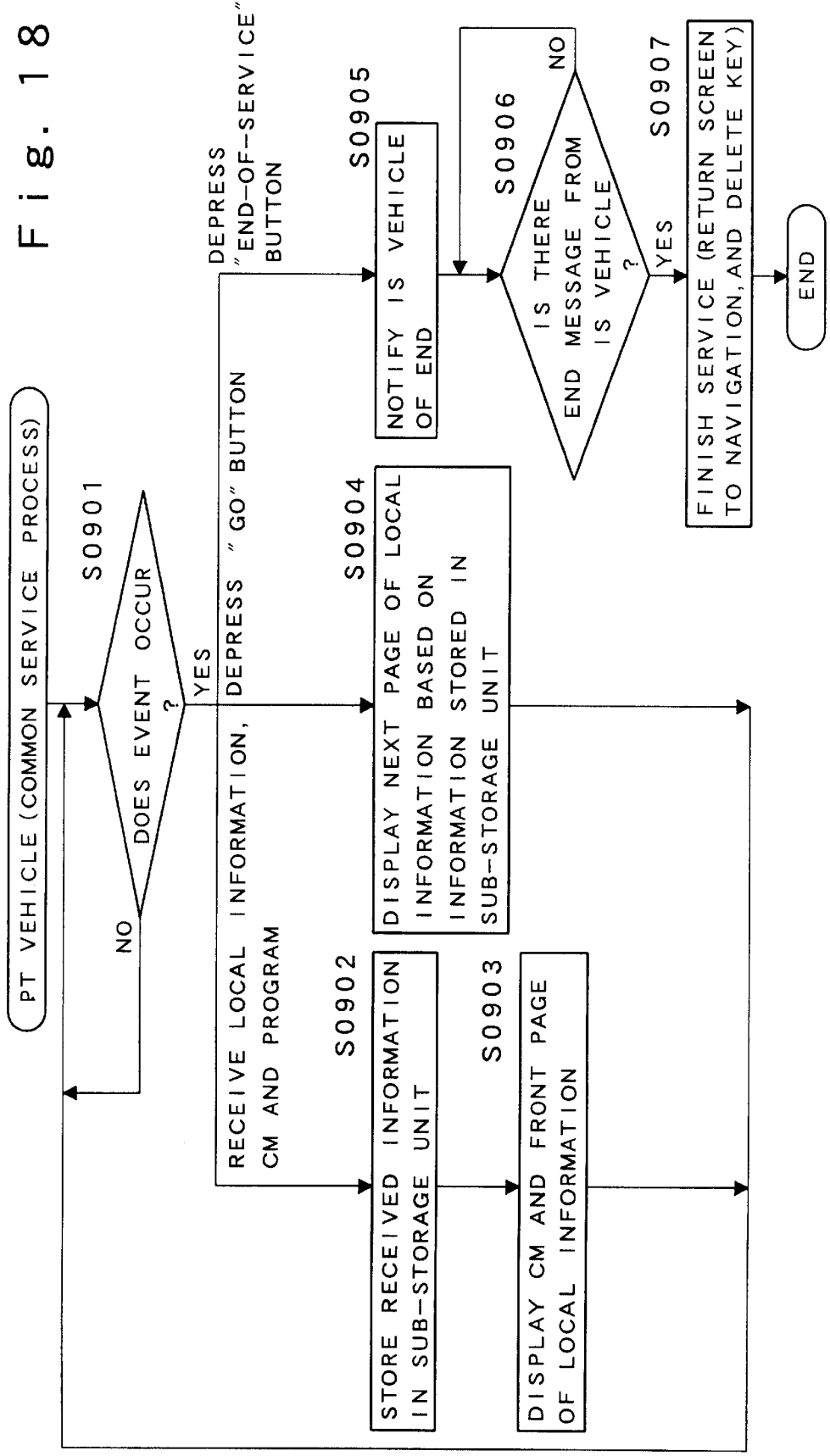
FIG. 18 is a flowchart showing a common service process executed by the processing unit of the PT.
Figure 19:
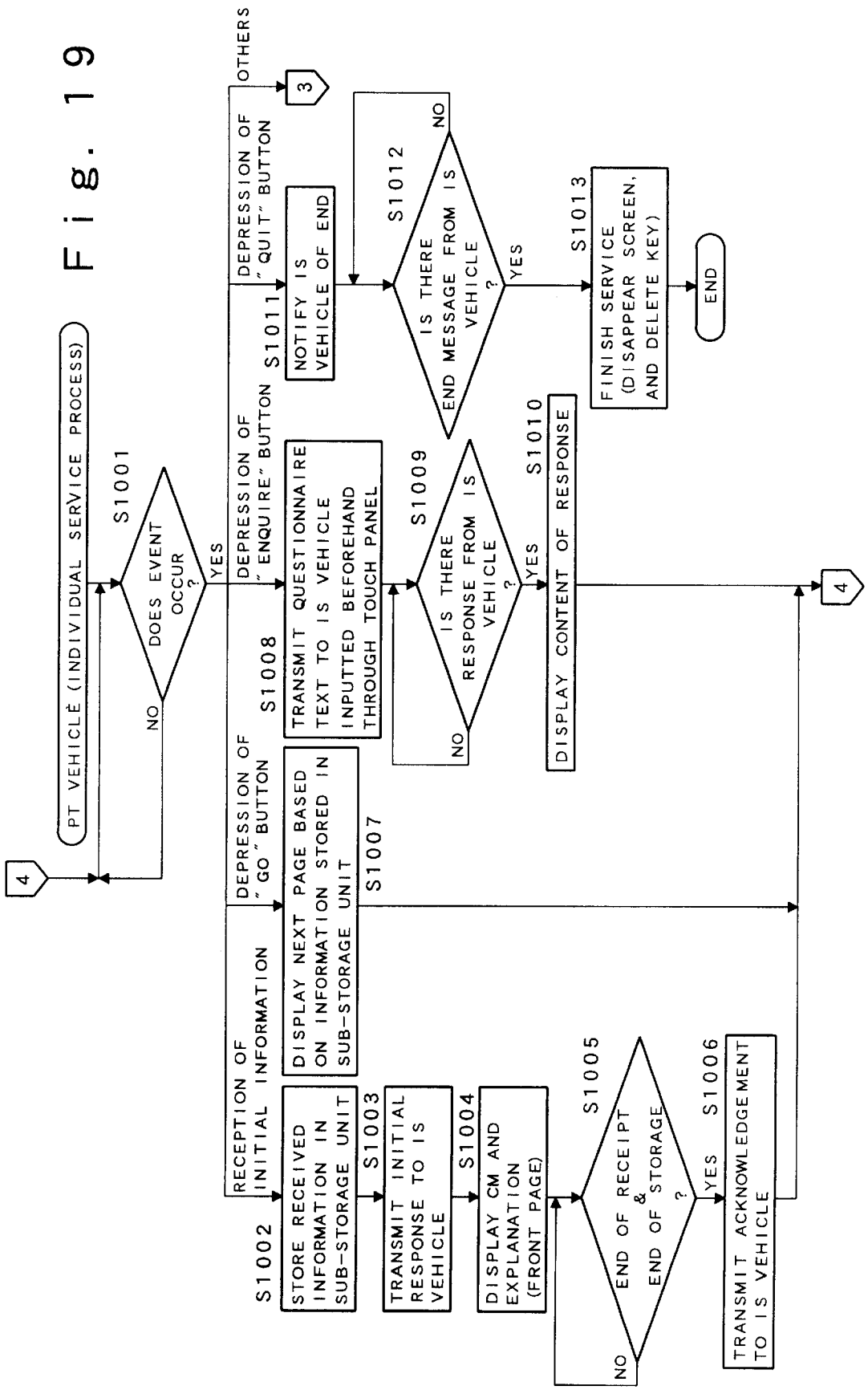
FIG. 19 is a flowchart showing an individual service process executed by the processing unit of the PT.

In contrast with this, if notified of a start of the service within the predetermined time, the processing unit 141 activates the common service process shown in FIG. 18 in the case of the IS key being registered in the sub-storage unit 143 or the individual service process shown in FIG. 19 in the case the IS key is not registered in the sub-storage unit 143.

(IS Terminal)

Figure 9:
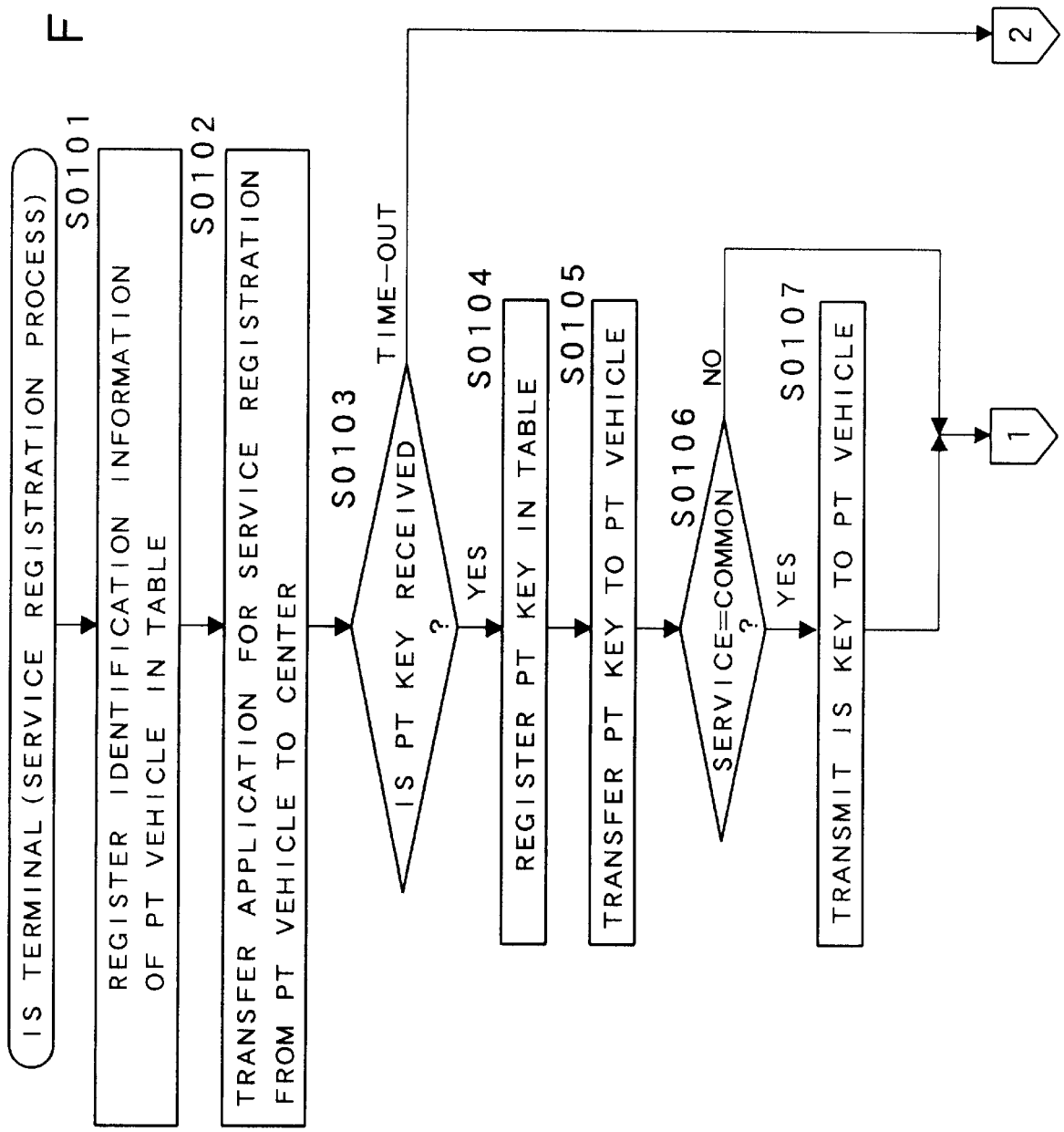
FIG. 9 is a flowchart showing a service registration process executed by a processing unit of the IS terminal.
Figure 10:
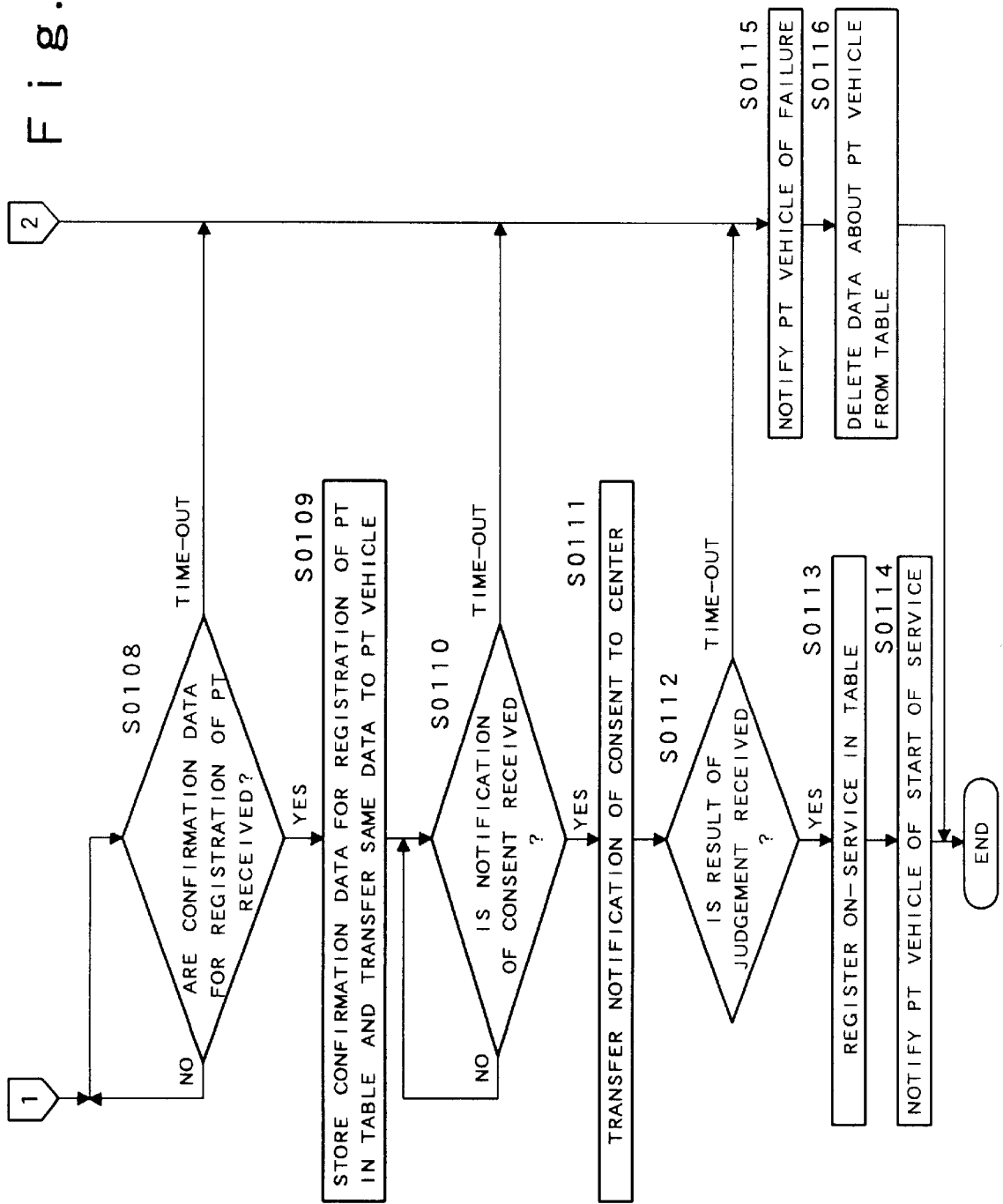
FIG. 10 is a flowchart showing a service registration process executed by a processing unit of the IS terminal.

The processing unit 131 of the IS terminal 130 starts the service registration process shown in FIG. 9 in parallel to the process that has been executed so far, each time the processing unit 131 receives the application for the service registration (S0001) from any one of the PT vehicles 14 existing within its covering area. In first step S0101 after the start, the processing unit 131 registers, in the table 1331, the car number of the PT vehicle 14 contained in the application for the service registration.

In next step S0102, the processing unit 131 transfers the application for the service registration given from the PT vehicle 14 to the center 11.

In next step S0103, the processing unit 131 waits for notifications of the PT key and the service category from the center 11. Then, if the PT key and the service category has not been notified for a predetermined time, the processing unit 131 advances the processing to S0115.

Whereas if the PT key and the service category has been notified from the center 11 within the predetermined time, the processing unit 131 registers the notified PT key in the table 1331 in S0104.

In next step S0105, the processing unit 131 transfers the PT key of which the center 11 notified, to the PT vehicle 14 which made the application for the service registration.

In next step S0106, the processing unit 131 checks whether the service category of which the center 11 notified is "common service" or "individual service". Then, if the service category is "individual service", the processing proceeds directly to S0108. On the contrary, if the service category is "common service", however, the processing unit 131 transmits the IS key for identifying itself to the PT vehicle 14 which made the application in S0107. Thereafter, the processing goes forward to S0108.

In S0108, the processing unit 131 waits for receiving the "confirmation data for registration of PT" from the center 11. Then, if the processing unit 131 has not received the "confirmation data for registration of PT" for a predetermined time, it advances the processing to S0115.

Whereas if able to receive the "confirmation data for registration of PT" from the center 11 within the predetermined time, in S0109, the processing unit 131 transfers the "confirmation data for registration of PT" received from the center 11 to the PT vehicle 14 which made the application, and registers the content of the contract contained in the "confirmation data for registration of PT" in the table 1331.

In next S0110, the processing unit 131 waits for receiving a notification of the consent (S0009) from the PT vehicle 14 which made the application. Then, the processing unit 131 has not received the notification of the consent for a predetermined time, it advances the processing to S0115.

By contrast, if notified of the consent from the PT vehicle 14 which made the application within the predetermined time, the processing unit 131 transfers the notification of the consent received from the PT vehicle 14 to the center 11 in S0111.

In next step S0112, the processing unit 131 waits for a result of judgement to be notified from the center 11. Then, the processing unit 131 has not received the result of judgement "OK" within a predetermined time, it advances the processing to S0115.

Whereas if able to receive the result of judgement "OK" from the center 11 within the predetermined time, the processing unit 131 registers that the service is being provided in the table 1331 in S0113.

In next step S0114, the processing unit 131 notifies the PT vehicle 14 which made the application of a start of the service, and thereafter finishes this service registration process.

While on the other hand, in S0115, the processing unit 131 notifies the PT vehicle 14 which made the application of the error massage.

In next step S0116, the processing unit 131 deletes all pieces of information about the PT vehicle 14 which made the application out of the table 1331, and thereafter quits this service registration process.
(Center)

Figure 11:
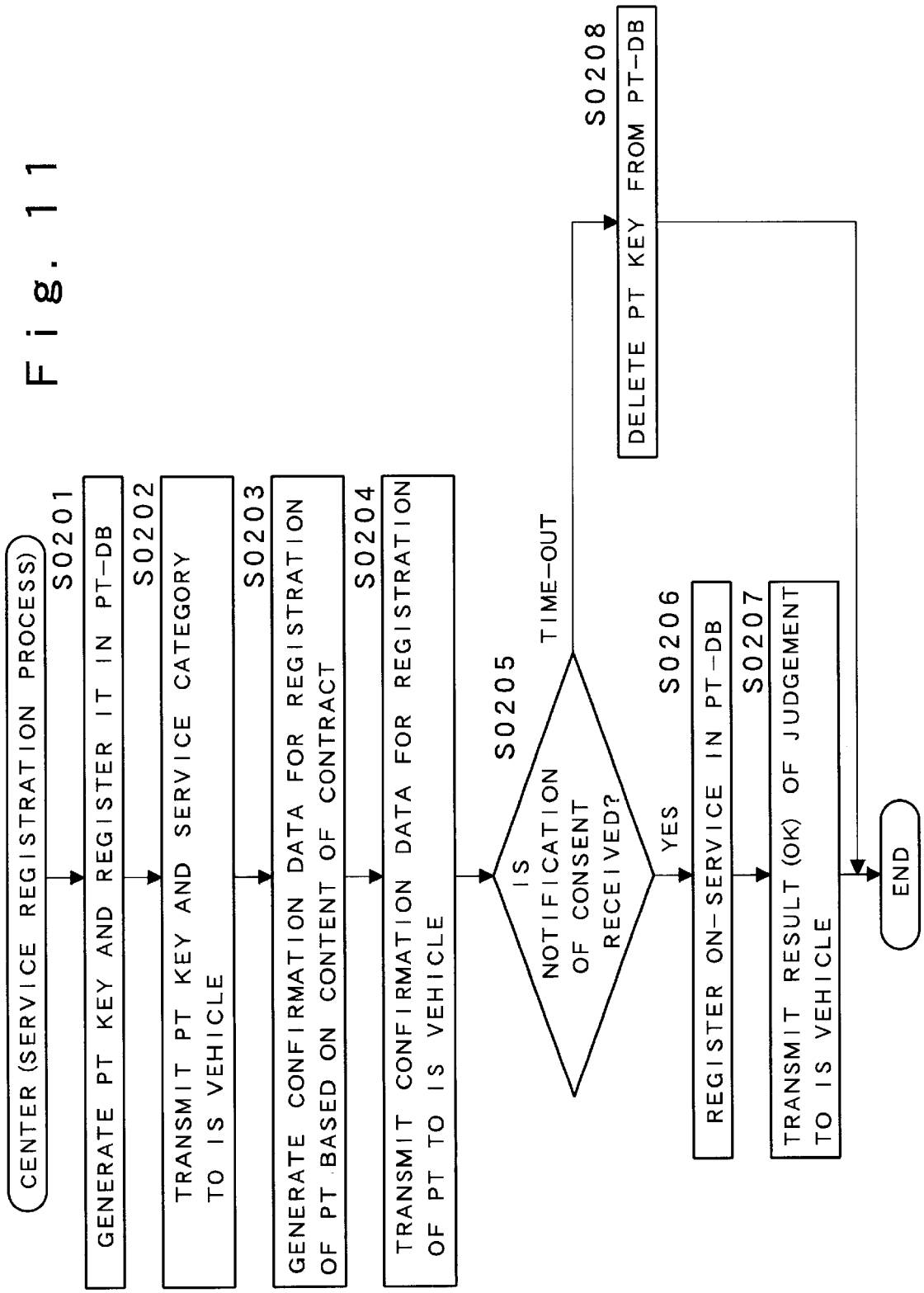
FIG. 11 is a flowchart showing a service registration process executed by a central processing unit of the center.

The CPU 111 of the center 11 starts the service registration process shown in FIG. 11 in parallel to the process that has been executed so far, each time the CPU 111 receives the application for the service registration (S102) from any one of the IS vehicles 13 through any one of the RSTs 12. In first step S0201 after the start, the CPU 111 generates an unique PT key and registers the PT key in an entry with respect to the PT vehicle 14 which made the application in the PT database 1133.

In next step S0202, the CPU 111 transmits, to the IS vehicle 13, the PT key generated in S0201 and the service category about the PT vehicle 14 which made the application in the PT database 1133.

In next step S0203, the CPU 111 generates the "confirmation data for registration of PT" containing the contract content (such as a range of the information provided to the customer on the PT vehicle 14, and so on) about the PT vehicle 14 that is registered in the PT database 1133.

In next step S0204, the CPU 111 transmits the "confirmation data for registration of PT" that has been generated in S0203 to the IS vehicle 13 which made the application of the service registration.

In next step S0205, the CPU 111 checks whether or not a notification of a consent is received from the PT vehicle 14 which made the application via the IS vehicle 13. Then, if unable to receive the notification of the consent within a predetermined time, the CPU 111 deletes the PT key about the PT vehicle 14 which made the application from the PT database 1133, and thereafter finishes this service registration process.

Whereas if able to be notified of the consent within the predetermined time, the CPU 111 registers that the service is being provided in an entry corresponding to the PT vehicle 14 in the PT database 1133 in S0206.

In next step S0207, the CPU 111 transmits a result of a judgement "OK" to the IS vehicle 13, and thereafter finishes this service registration process.
<Service Process>
(IS terminal)

Figure 12:
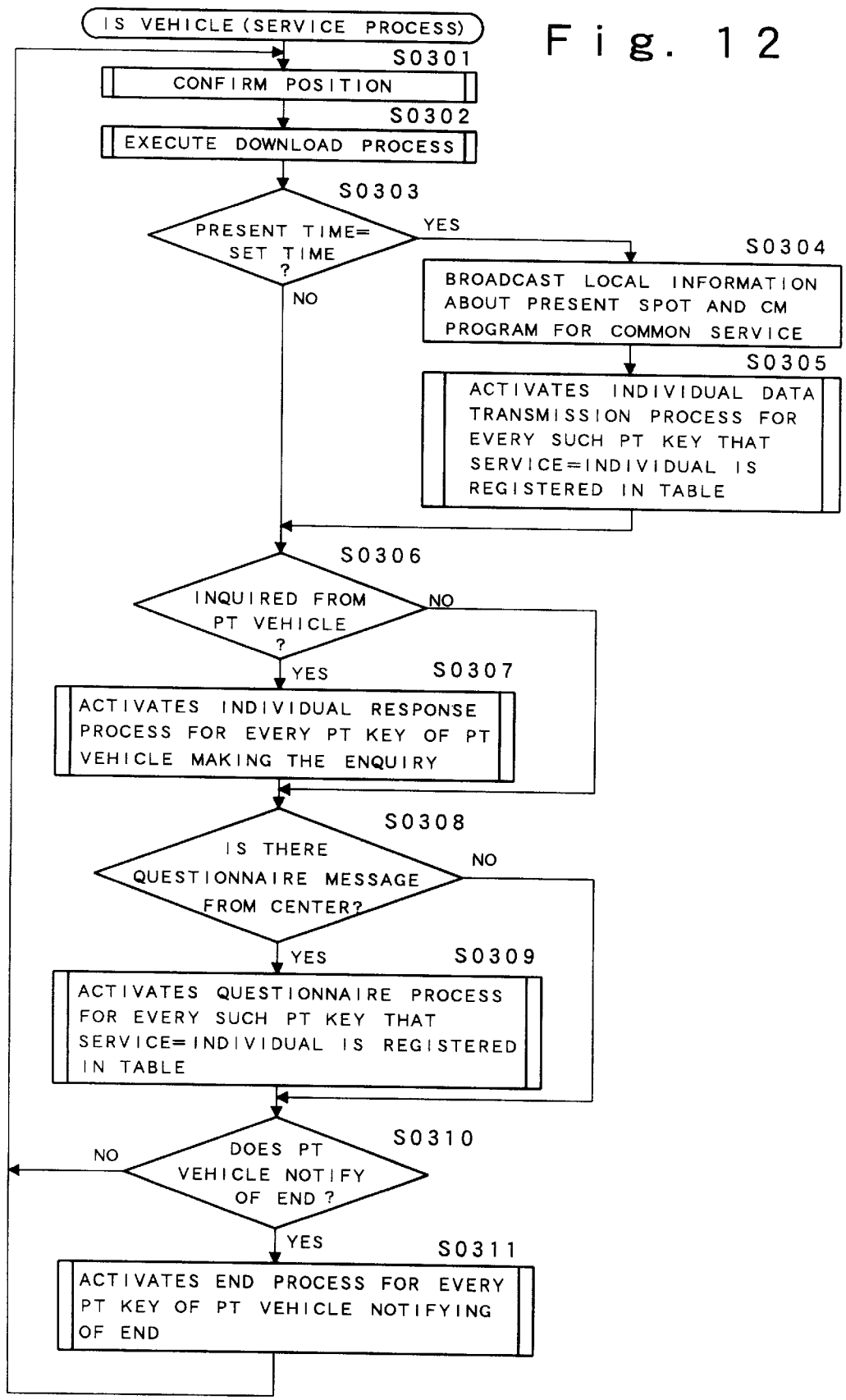
FIG. 12 is a flowchart showing a service process executed by the processing unit of the IS terminal.

The processing unit 131 of the IS terminal 130 starts a service process shown in FIG. 12 upon switching ON a main power source. In first step S0301 after the start of the service process, the processing unit 131 confirms its present position on the basis of a signal transmitted from the GPS unit 135.

Figure 13:
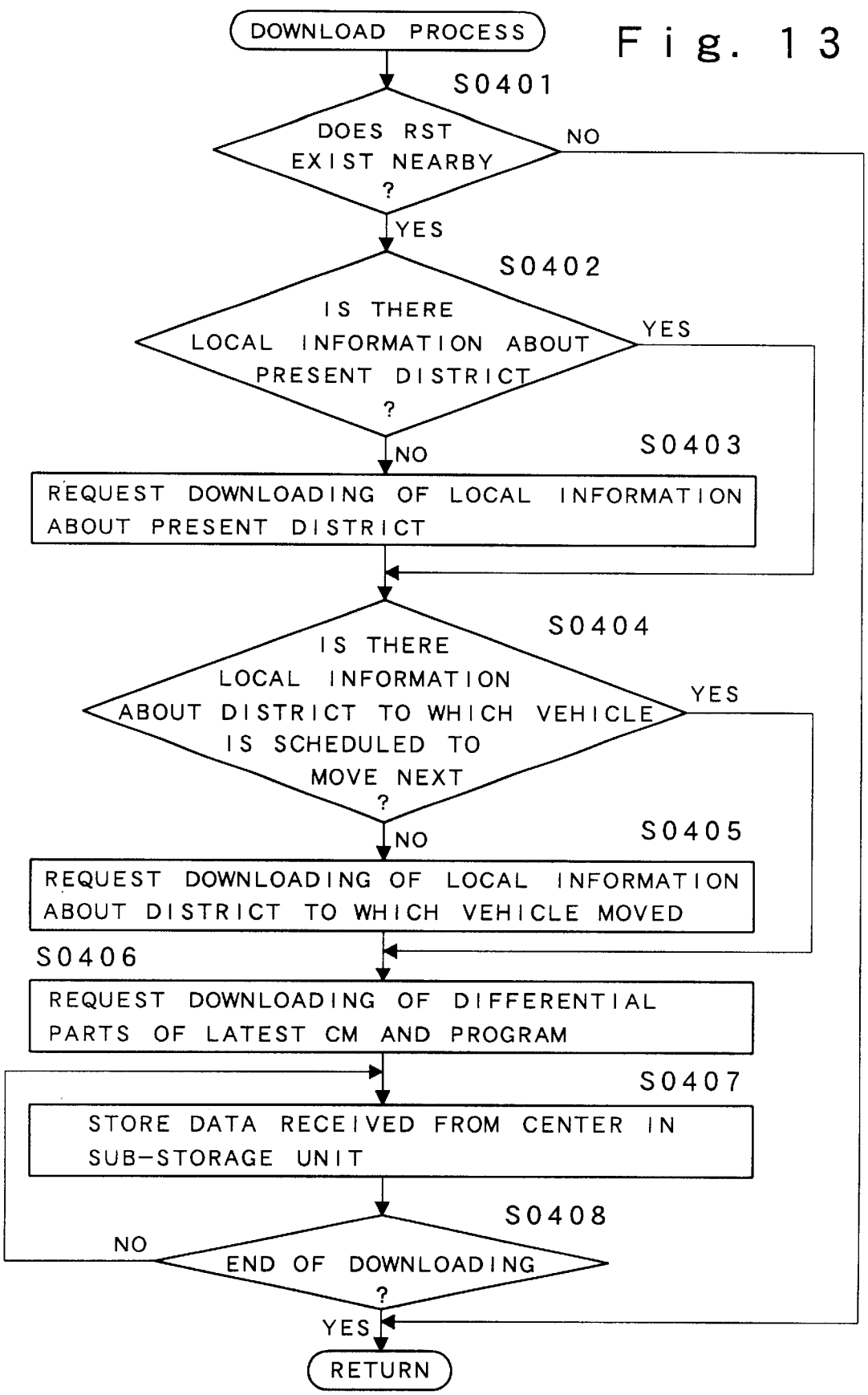
FIG. 13 is a flowchart showing a download process executed by the processing unit of the IS terminal.

In next step S0302, the processing unit 131 executes a download process. FIG. 13 is a flowchart showing a download process subroutine executed in S0302. In first step S0401 after entering this subroutine, the processing unit 131 checks whether or not there exists the RST 12 of which covering area includes the present position detected at. S0301 and which is therefore communicable. Then, if there is not such an RST 12, downloading is not executable, and hence the processing unit 131 finishes this download process subroutine and returns the processing to the main routine in FIG. 12.

In contrast with this, if a communicable RST 12 exists, the processing unit 131 checks in next step S0402 whether or not local information about a district including the present position confirmed in S0301 exists in the information storage area 1332 in the sub-storage unit 133. Then, there exists the local information about the present district, the processing unit 131 advances the processing directly to S0404. Whereas if there is no local information about the present district, the processing unit 131 requests the center 11 via the RST 12 to download the local information about the present district in S0403, and thereafter advances the processing to S0404.

In S0404, the processing unit 131 checks whether or not the information storage area 1332 in the sub-storage unit 133 contains the local information on a district to which the IS vehicle 13 is scheduled to move next. Then, if there exists the local information about the next district, the processing unit 131 advances the processing directly to S0406. Whereas if the local information about the next district does not exist, the processing unit 131 requests the center 11 via the RST 12 to download the local information about the next district in S0405, and thereafter advances the processing to S0406.

In S0406, the processing unit 131 requests the center 11 via the RST 12 to download a different part of the latest CM and program information which is different from that presently stored in the information storage area 1332. Note that requesting to download the different part of the CM and program information implicates requesting to download only the partial information of the CM and program information which is changed, added or deleted within the CM folder and the program folder of the content database 1131 in the sub-storage unit 113 of the center 11 after the CM and program information is downloaded last time in a case where the request for downloading has been ever made before.

In next step S0407, the processing unit 131 stores the data (the local information, the CM information and the program information) received from the center 11 in the information storage module 1332 of the sub-storage unit 133. Then, in next step S0408, the processing unit 131 checks whether or not the download requested in S0403, S0405 or S0406 is completed. Then, if the download is not yet completed, the processing goes back to S0407. If the download is completed, this download process is ended, and the processing returns to the main routine in FIG. 12.

In the main routine in FIG. 12, the processing unit 131 checks in S0303 next to S0302 whether or not the present time reaches a preset time. Note that this preset time may be set at arbitrary specified time, or periodically set at predetermined interval (e.g., 10 minutes). Then, if the present time does not reach the preset time, the processing unit 131 advances the processing directly to S0306. Whereas if the present time reaches the preset time, the processing unit 131, in S0304, broadcasts the local information about a present spot (which is an unit of place into which one district is subdivided) within the present district and some pieces of the CM information and program information, to the common service target PT vehicles 14 existing in its covering area. Not that broadcasting in this explanation means to send information in a receivable state on condition that the PT vehicles 14 have the IS key.

Figure 14:
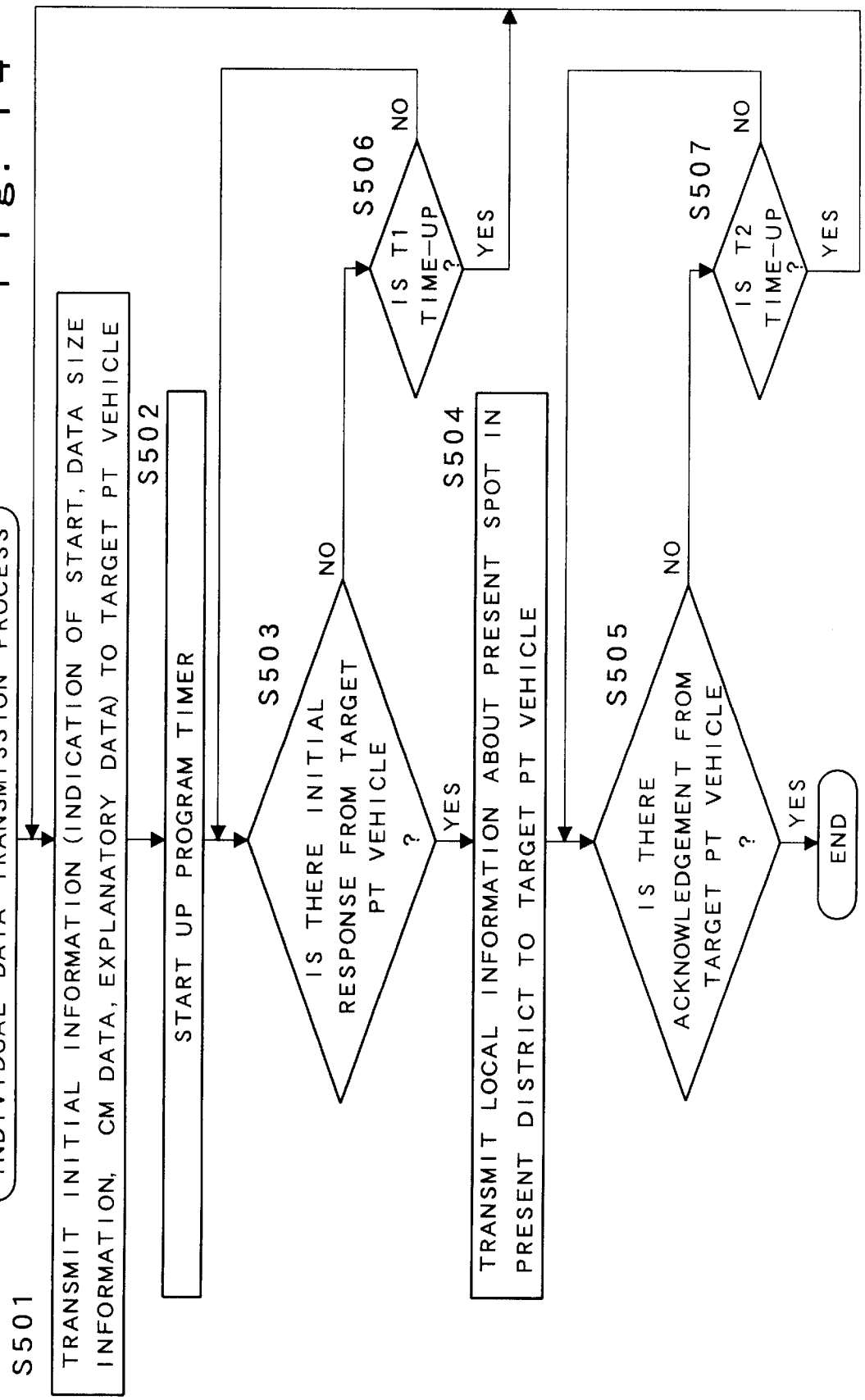
FIG. 14 is a flowchart showing an individual data transmission process executed by the processing unit of the IS terminal.

In next step S0305, the processing unit 131 activates the individual data transmission process shown in FIG. 14 for every PT key with respect to which the service category is registered to be "individual service" in the table 1331. A plurality of activated individual data transmission process are executed in parallel to the service process shown in FIG. 12, and therefore its explanation will be made later on. Then, upon a completion of activating the individual data transmission process in S0305, the processing unit 131 advances the processing to S0306.

In S0306, the processing unit 131 checks whether or not there is received an enquiry massage (S1008, S1017) from any one of the PT vehicles 14 existing within its covering area. Then, if the enquiry massage is not received, the processing unit 131 advances the processing to S0308. By contrast, if the enquiry massage is received from any one of the PT vehicles 14, the processing unit 131 activates a process (task) for an individual response process shown in FIG. 15 for every PT key embedded in the enquiry massage in S0307. A plurality of activated individual response process are executed in parallel to the process for the service process shown in FIG. 12, and therefore its explanation will be made later on. Then, upon a completion of activating the process for the individual response process in S0307, the processing unit 131 advances the processing to S0308.

In S0308, the processing unit 131 checks whether or not there is received an questionnaire text (S1104) from the center 11 via the RST 12. Then, if the questionnaire text is not received, the processing unit 131 advances the processing to S010. In contrast with this, if the questionnaire text is received, the processing unit 131 activates an questionnaire process shown in FIG. 16 for every PT key with respect to which the service category is registered to be "individual service" in the table 1331 in S0309. A plurality of activated questionnaire process are executed in parallel to the service process shown in FIG. 12, and hence its explanation will be made later on. Then, upon a completion of activating the questionnaire process in S0309, the processing unit 131 advances the processing to S0310.

In S0310, the processing unit 131 checks whether or not there is received an end notification (S1011) from any one of the PT vehicles 14 existing within its covering area. Then, if the end notification is not received, the processing unit 131 returns the processing to S0301. By contrast, if the end notification is received from any one of the PT vehicles 14, the processing unit 131 activates an end process shown in FIG. 17 for every PT key embedded in the end notification in S0311. A plurality of activated end process are executed in parallel to the process for the service process shown in FIG. 12, and hence its explanation will be made later on. Then, upon a completion of activating the end process in S0311, the processing unit 131 returns the processing to S0301.

Note that the processing unit 131, if a content of the enquiry massage from the PT vehicle 14 is out of a range prescribed based on the contract registered in the table 1331 with respect to the same PT vehicle 14, ignores this enquiry message in S0307. The enquiry massage, however, may be that for requesting to change the content of the contract, so that the IS vehicle may answer the PT vehicle 14 having sent such enquiry message of which content is out of the range of the contract a warning message of this purport, and may request the same PT vehicle 14 to transmit the enquiry message for requesting to change the contract content. The processing unit 131 receiving the enquiry message requesting to change the contract content, instead of executing the individual response process shown in FIG. 15, requests the center 11 to change the contract content in the PT database 1133 about the customer 4 on the PT vehicle 14, and thereafter temporarily stops the service process with respect to this PT vehicle 14. Then, the processing unit 131 activates a timer after prompting the PT vehicle 14 to retransmit the application for the service registration. If the PT vehicle 14 retransmits the application for the service registration in response thereto, the processing unit 131 and the center 11, based on the contract content after being changed, execute the service registration process described above. As a result of this service registration process, a notification of consent (S0009) to the contract content after being changed is transmitted from the PT vehicle 14 within a predetermined time since the start-up of the timer, the processing unit 131 and the center 11 implements providing the service in accordance with the new contract content. Namely, when receiving the enquiry message for requesting information within the range according to the new contract content, the processing unit 131 does not ignore this enquiry message in S0306, and advances the processing to S0307. Further, the center 11 informs the travel agent 3 of a difference in amount of the service charge based on the new contract content as an additional amount charged to the customer 4. On the other hand, if unable to be notified of the consent (S0009) within the predetermined time, the processing unit 131 and the center 11 set the contract contents registered respectively therein back to those original, and resume the service for the PT vehicle 14 in accordance with the original contract contents.

In the individual data transmission process shown in FIG. 14, at first step S0501 after the start, the processing unit 131 transmits initial information to the PT vehicle 14 having the PT key that becomes a process target (which will hereinafter called a "target PT vehicle"). The initial information contains a start indication that indicates a start of transmitting information, a data size of the whole information to be transmitted, a part of the CM information in the information storage area 1332, and explanatory data for explaining a significance of information to be transmitted.

In next step S0502, the processing unit 131 starts up a program timer.

In next step S0503, the processing unit 131 checks whether or not there is received an initial response (S1004) from the target PT vehicle 14. If the initial response is not received, the processing unit 131 checks in S0506 whether or not preset time T1 has elapsed after starting up the program timer in S0502. If the preset time T1 has not yet elapsed, the processing unit 131 returns the processing to S503. If the preset time T1 has elapsed, the processing unit 131 returns the processing to S0501 and transmits again the initial information to the target PT vehicle 14.

While on the other hand, if the initial response is received from the target PT vehicle 14 before the preset time T1 elapses after starting up the program timer in S0502, the processing unit 131 transmits the local information about the present spot in the present district to the target PT vehicle 14 in S0504.

In next step S0505, the processing unit 131 checks whether or not an acknowledgement (S1006) is received from the target PT vehicle 14. If the acknowledgement is not received, the processing unit 131 checks in S0507 whether or not preset time T2 (where T2>T1) has elapsed after starting up the program timer in S0502. If the preset time T2 has not yet elapsed, the processing unit 131 returns the processing to S0505. If the preset time T2 has elapsed, the processing unit 131 returns the processing to S0501 and retransmits the initial information to the target PT vehicle 14.

While on the other hand, if the acknowledgement is received from the target PT vehicle 14 before the preset time T2 elapses after starting up the program timer in S0502, the processing unit 131 quits this individual data transmission process.

Figure 15:
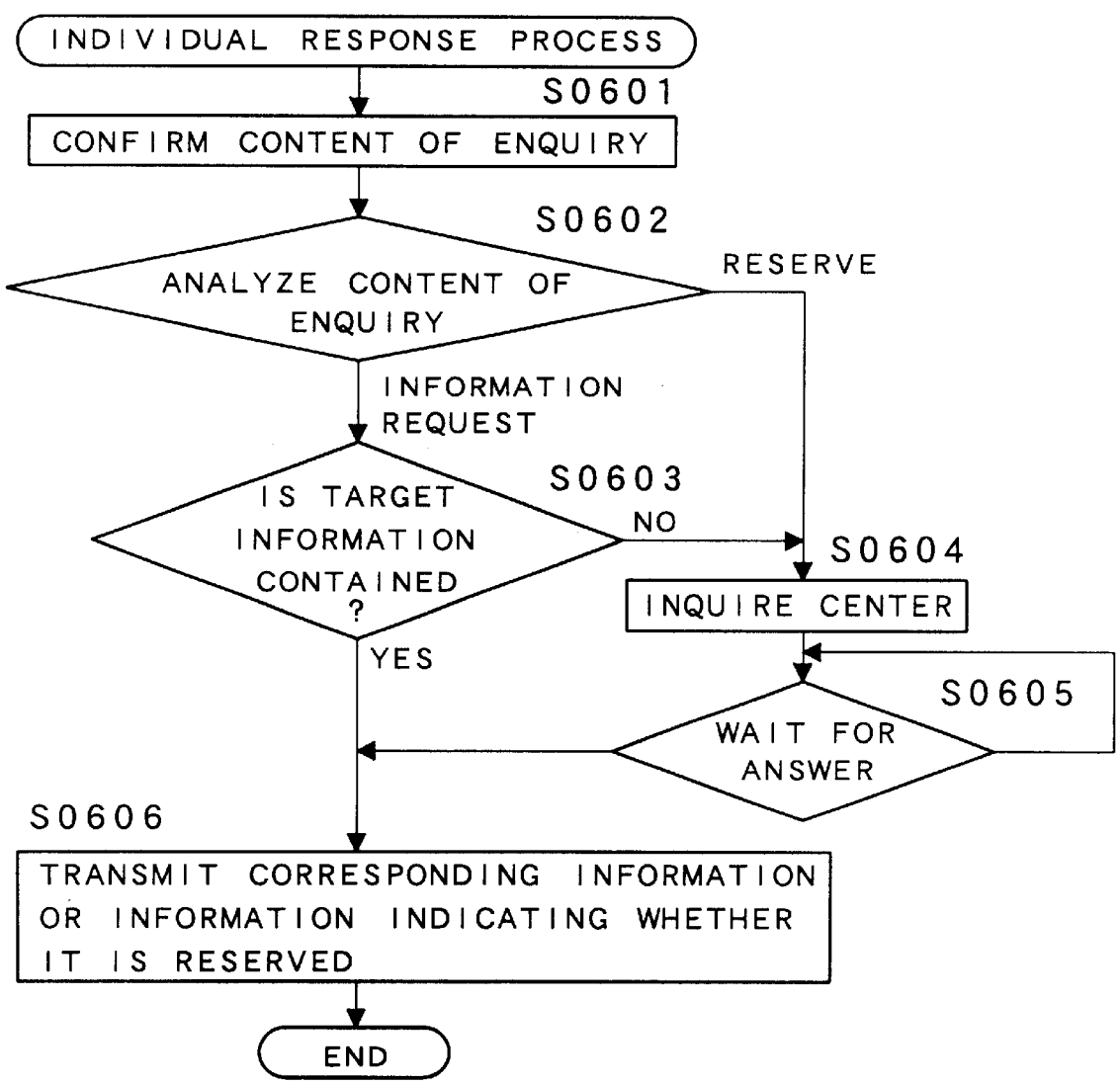
FIG. 15 is a flowchart showing an individual response process executed by the processing unit of the IS terminal.

In the individual response process shown in FIG. 15, at the first step S0601 after the start, the processing unit 131 confirms a content of the enquiry message received from the PT vehicle 14 having the PT key that becomes a process target (which will hereinafter be called a "target PT vehicle").

In next step S0602, the processing unit 131 classifies a content of the enquiry message confirmed in S0601 into categories of a reservation of the parking lot or the souvenir shop or the restaurant, or a request for the local information. Then, when the content of the enquiry message is the request for the reservation, the processing unit 131 advances the processing to S0604.

On the other hand, when the content of the enquiry message is classified into the request for the local information, the processing unit 131 checks in S0603 whether or not the information corresponding to the request exists in the information storage area 1332 of the sub-storage unit 133. If the information corresponding to the request exists in the information storage area 1332, the processing unit 131 advances the processing to S0606. Whereas if the information corresponding to the request does not exist, in the information storage area 1332, the processing unit 131 advances the processing to S0604.

In S0604, the processing unit 131 transfers the enquiry message to the center 11 via the RST 12. In next Step S0605, the processing unit 131 waits for an answer (which is information corresponding to the request or information showing whether or not it is reserved and which is to be transmitted in S1103) to the enquiry message transferred in S0604 from the center 11. When receiving the answer from the center 11, the processing unit 131 advances the processing to S0606.

In S0606, the processing unit 131 transmits, to the target PT vehicle 14, a corresponding piece of information in the information storage area 1332 or a corresponding piece of information received from the center 11 in case the content of the enquiry message is the request for the information, or the information indicating whether or not it is reserved which is received from the center 11 in case the content of the enquiry message is the request for the reservation. Thereafter, the processing unit 131 finishes this individual response process.

Figure 16:
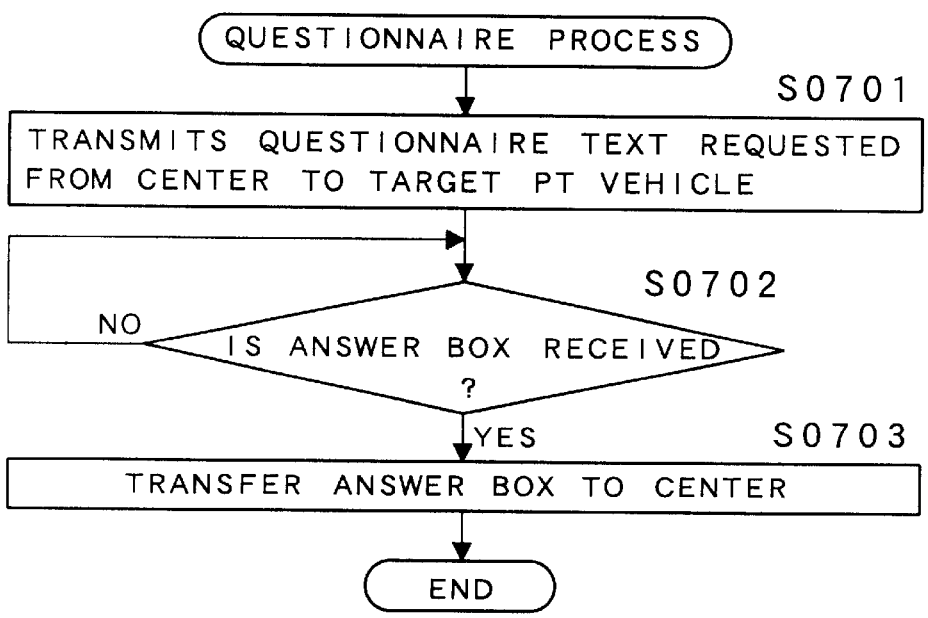
FIG. 16 is a flowchart showing a questionnaire process executed by the processing unit of the IS terminal.

In the questionnaire process shown in FIG. 16, the processing unit 131, in first step S0701 after the start, transmits a questionnaire text received from the center 11 to the PT vehicle having the PT key that becomes a process target (which will hereinafter be called a "target PT vehicle").

In next step S0702, the processing unit 131 waits for an answer (answer BOX) to the enquiry message transmitted in S0701 from the target PT vehicle 14. When receiving the answer BOX from the target PT vehicle 14, the processing unit 131 transfers the answer BOX to the center 11, and thereafter finishes this questionnaire process.

Figure 17:
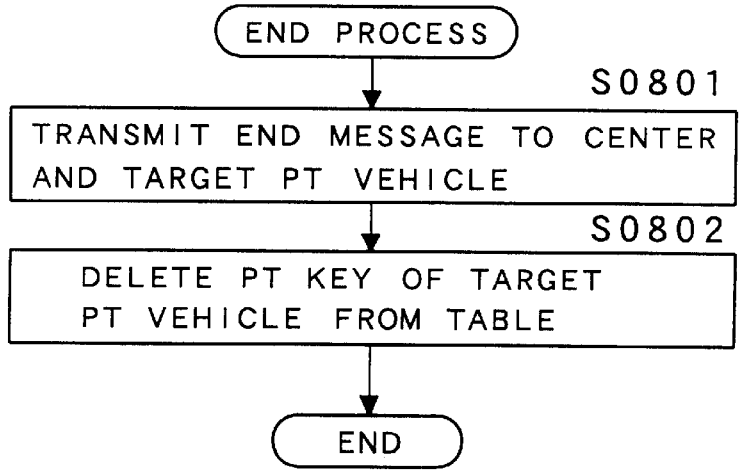
FIG. 17 is a flowchart showing an ending process executed by the processing unit of the IS terminal.

In the end process shown in FIG. 17, the processing unit 131, at first step S0801 after the start, transmits an end message indicating an end of service to the PT vehicle having the PT key that becomes a process target (which will hereinafter be called a "target PT vehicle").

In next step S0802, the processing unit 13 deletes all pieces of information about the PT keys of the target PT vehicles 14 from the table 1331 in the sub-storage unit 133, and thereafter finishes this end process.

(PT "Personal Terminal")

In the common service process shown in FIG. 18, the processing unit 141 of the PT 140 waits for an occurrence of event in first step S0901 after the start. Then, the processing unit 141 advances the processing to S0902, in the case of receiving the local information, the CM information and the program information (S0304) from the IS vehicle 130. The processing unit 141 advances the processing to S0904, when detecting a depression on the "GO" button displayed on the display of the I/O unit 144. The processing unit 141 advances the processing to S0905, when detecting a depression on the "end-of-service" button displayed on the display of the I/O unit 144.

In S0902, the processing unit 141 stores the respective pieces of information received from the IS vehicle 13 in the sub-storage unit 143. In next step S0903, the processing unit 141, based on the various pieces of information stored in the sub-storage unit 143, displays CM information as shown in FIG. 6 on the display of the I/O unit 144 that has been displaying so far the map on which the present position is pinpointed. Subsequently, the processing unit 141 displays a head page of the local information as shown in FIG. 7 thereon. Upon a completion of step S0903, the processing unit 141 returns the processing to S0901.

On the other hand, in S0904, the processing unit 141, based on the local information stored in the sub-storage unit 143, turns over the page of the local information displayed on the display to a next page. When completing S0904, the processing unit 141 returns the processing to S0901.

On the other hand, in S0905, the processing unit 141 transmits the end notification to the IS vehicle 13. In next step S0906, the processing unit 141 waits for the end message from the IS vehicle 13 (S0801). When receiving the end message in S0907, the processing unit 141 turned over the page displayed on the display back to the map and deletes the PT key and the IS key from the sub-storage unit 143. When completing S0907, the processing unit 141 quits this common service process.

Figure 20:
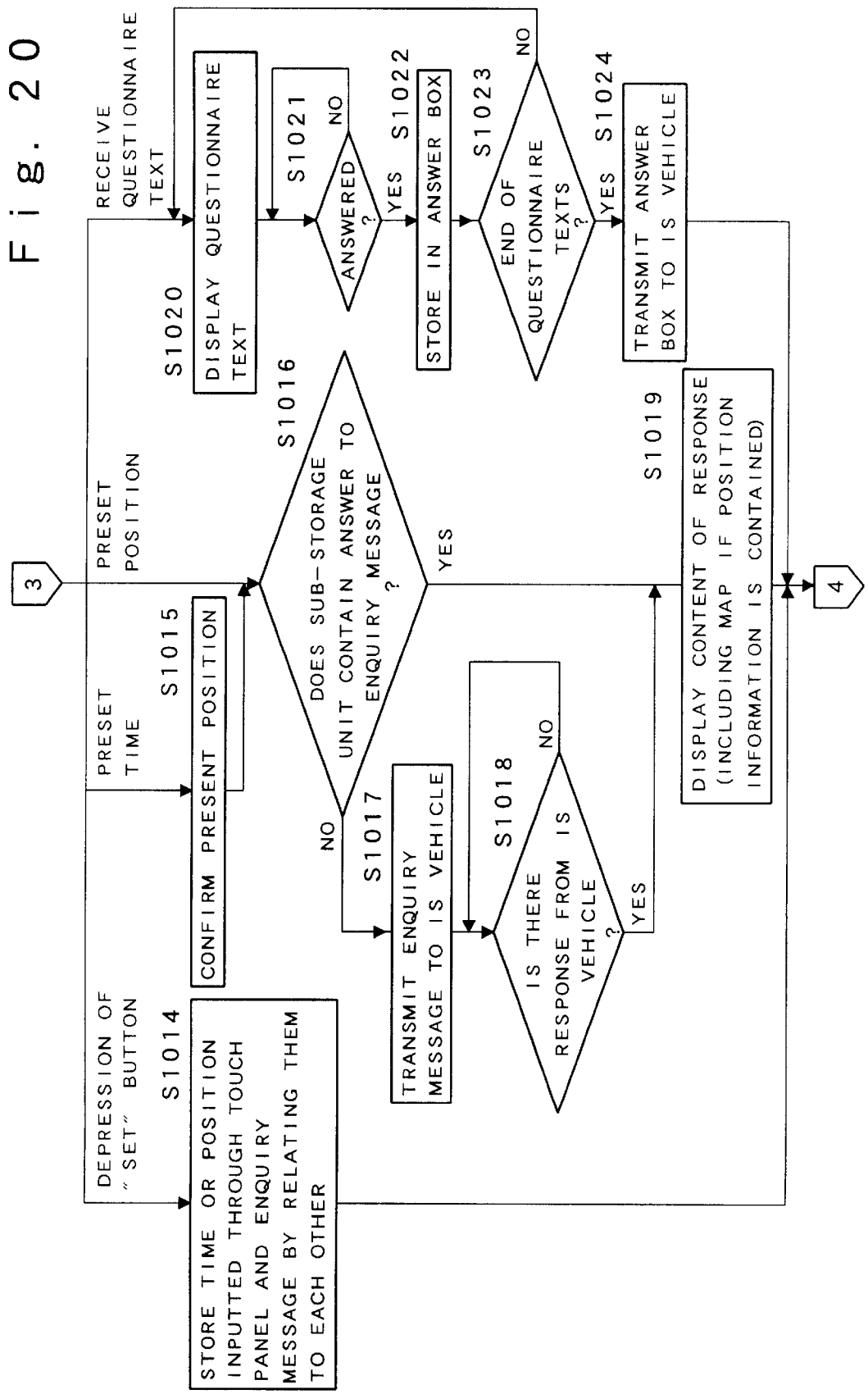
FIG. 20 is a flowchart showing an individual service process executed by the processing unit of the PT.

In the individual service process shown in FIGS. 19 and 20, the processing unit 141 of the PT 140 waits for an occurrence of event at first step S1001 after the start. Then, the processing unit 141, when receiving the initial information (S0501) from the IS vehicle 130, advances the processing to S1002. The processing unit 141, when detecting a depression on the "GO" button displayed on the display, advances the processing to S1007. The processing unit 141, when detecting a depression on the "ENQUIRY" button displayed on the display, advances the processing to S1008. The processing unit 141, when detecting a depression on the "QUIT" button displayed on the display, advances the processing to S1011. The processing unit 141, when detecting a depression on the "SET" button displayed on the display, advances the processing to S1014. The processing unit 141, when detecting that the present time reaches preset time (see S1014), advances the processing to S1015. The processing unit 141, when detecting based on a signal from the GPS unit 145 that its own PT vehicle 14 exists in a preset position, advances the processing to S1016. The processing unit 141, when the processing unit 141 receiving the questionnaire text (S0701) from the IS vehicle 13, advances the processing to S1020.

In S1002, the processing unit 141 starts storing the sub-storage unit 143 with the information (initially the initial information transmitted in S0501 and thereafter the local information transmitted in S0504) transmitted by the IS vehicle 13.

In next step S1003, the processing unit 141 transmits an initial response to the IS vehicle 13.

In next step S1004, the processing unit 141 displays the CM information as shown in FIG. 6 on the display of the I/O unit 144 that has been displaying so far the map on which the present position is pinpointed, on the basis of the initial information stored in the sub-storage unit 143. Subsequently, the processing unit 141, based on the local information stored in the sub-storage unit 143, displays a front page of the local information as shown in FIG. 7.

In next step S1005, the processing unit 141 waits for completion of receiving the information transmitted from the IS vehicle 13 and of storing the same in the sub-storage unit 143.

When completing receiving the information transmitted from the IS vehicle 13 and storing the same information in the sub-storage unit 143, the processing unit 141 transmits the acknowledgment to the IS vehicle 13 in S1006. When completing S1006, the processing unit 141 returns the processing to S1001.

On the other hand, in S1007, the processing unit 141 displays a next page of the local information on the display of the I/O unit 144 on the basis of the local information stored in the sub-storage unit 143. Upon a completion of S1007, the processing unit 141 returns the processing to S1001.

On the other hand, in S1008, the processing unit 141 transmits an enquiry message that has been inputted beforehand by the customer 4 through the touch panel or the keyboard of the I/O unit 144 to the IS vehicle 13.

In next step S1009, the processing unit 141 waits for a response (S0606) from the IS vehicle 13.

When receiving the response from the IS vehicle 13, the processing unit 141 displays a content of the response received from the IS vehicle 13 on the display of the I/O unit 144 in S1010. When step S1010 is completed, the processing unit 141 returns the processing to S1001.

On the other hand, in S1014, the processing unit 141 stores the sub-storage unit 143 with time or a position and the enquiry message that have been inputted previously by the customer 4 through the touch panel or the keyboard of the I/O unit 144 in a way of relating them each other upon a completion of this step S1014, the processing unit 141 returns the processing to S1001.

On the other hand, in S1015 which is to be executed when it is detected that present time reaches the preset time stored in the sub-storage unit 143 in S1014, the processing unit 141 confirms present position of its own PT vehicle 14 on the basis of the signal from the GPS unit 145. In S1016 which is to be executed after completion of S1015 or when it is detected that the present traveling position of its own PT vehicle 14 comes in the preset position stored in the sub-storage unit 143 in S1014, the processing unit 141 checks whether or not an answer to the enquiry message stored related to the present time or the present traveling position in the sub-storage unit 143, is contained in the local information in the sub-storage unit 143. Then, if the answer to the enquiry message is contained in the local information in the sub-storage unit 143, the processing proceeds directly to S1019.

Whereas if the answer to the enquiry message is not contained in the local information in the sub-storage unit 143, the processing unit 141 transmits the enquiry message to the IS vehicle 13 in S1017.

In next step S1018, the processing unit 141 waits for a response (S0606) to the enquiry message transmitted in S1017 from the IS vehicle 13. Then, when receiving the response from the IS vehicle 13, the processing unit 141 advances the processing to S1019.

In S1019, the processing unit 141 displays, on the display, a content of the response to the enquiry message. When it is judged in S1016 that an answer is contained in the sub-storage unit 143, the response to be displayed is this answer. When it is judged in S1016 that the answer is not contained in the sub-storage unit 143, the response to be displayed is a content of response received from the IS vehicle 13. Note that if the content of response contains a piece of position information, the map on which a position indicated by the position information is pinpointed is also displayed on the display. When completing this step S1019, the processing unit 141 returns the processing to S1001.

On the other hand, in S1020, the processing unit 141 displays one of the questionnaire texts received from the IS vehicle 13.

In next step S1021, the processing unit 141 waits for an answer to the questionnaire text to be inputted through the touch panel or the keyboard of the display/voice I/O unit 144. When the answer to the questionnaire text is inputted, the processing unit 141 stores the inputted answer into an answer BOX in the sub-storage unit 143 in S1022.

In next step S1023, the processing unit 141 checks whether or not it has completed displaying all the questionnaire texts. Then, if it has not yet completed displaying all the questionnaire texts received from the IS vehicle 13, the processing unit 141 returns the processing to S1020, and displays a next questionnaire text.

Whereas if it has completed displaying all the questionnaire texts received from the IS vehicle 13, the processing unit 141 transmits the content of the answer BOX to the IS vehicle 13 in S1024. When this step S1024 is completed, the processing unit 141 returns the processing to S1001.

On the other hand, in S1011, the processing unit 141 transmits the end notification to the IS vehicle 13. In next step S1012, the processing unit 141 waits for the end message from the IS vehicle 13 (S0801). When receiving the end message, the processing unit 141 turned over the page displayed on the display back to the map in S1013, and deletes the PT key from the sub-storage unit 143. When comes to a completion of S1013, the processing unit 141 finishes this individual service process.

(Center)

Figure 21:
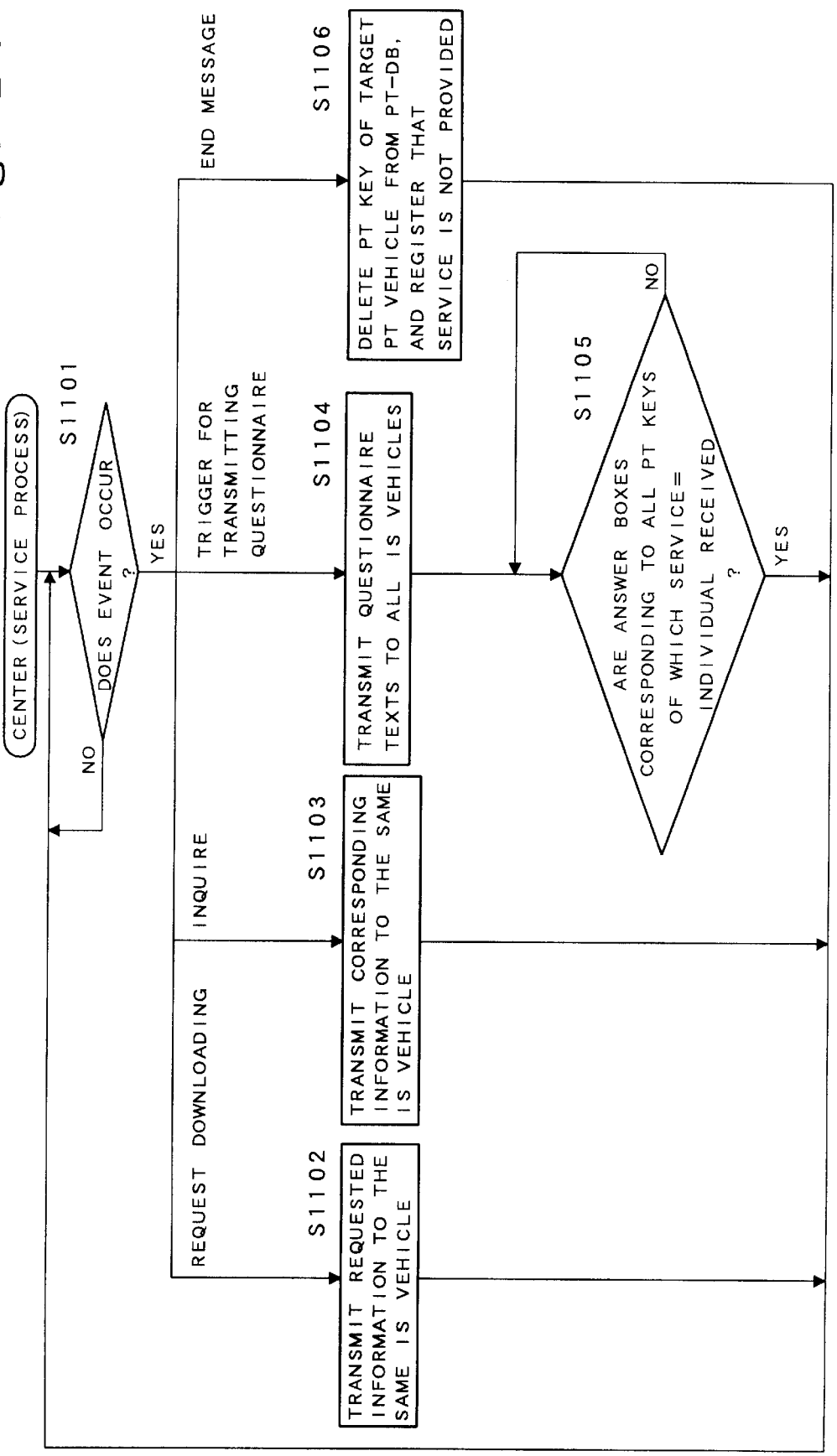
FIG. 21 is a flowchart showing a service process executed by the center.

The CPU 111 of the center 11, with the main power source being switched ON, starts a service process shown in FIG. 21. In first step S1101 after the start, the CPU 111 waits for an event to occur. Then, the CPU 111, when receiving a download request from the IS vehicle 13 (S0403, S0405, S0406), advances the processing to S1102. When receiving an enquiry message (S0604) from the IS vehicle 13, the CPU111 advances the processing to S1103. When receiving a request for executing the questionnaires from the private research company as the tie-up enterprise 2, or when detecting a preset questionnaire execution timing, the CPU 111 advances the processing to S1104. When receiving the end message (S0801) from the IS vehicle 13, the CPU111 advances the processing to S1106.

In S1102, the CPU 111 reads the requested information out of the sub-storage unit 113 and transmits the same information to the IS vehicle 13 having made the request. Upon a completion of this step S1102, the CPU 111 returns the processing to S1101.

On the other hand, in S1103, if the content of the enquiry message received from the IS vehicle 13 is the request for the information, the CPU 111 searches a corresponding piece of information from the sub-storage unit 113, and transmits the same information to the IS vehicle 13 having sent the message. By contrast, if the content of the enquiry message is a request for the reservation, the CPU 111 accesses a system or a homepage of the tie-up enterprise 2 (a parking lot, a souvenir shop, a restaurant and so on) via the network N, and inquires whether it is reservable or not. If reservable, the CPU 111 makes the reservation. Thereafter, the CPU111 transmits the information indicating whether it is reserved or not to the IS vehicle 13. When completing S1103, the CPU 111 returns the processing to S1101.

On the other hand, in S1104, the CPU 111 transmits the questionnaire texts stored in the questionnaire database 112 of the sub-storage unit 113 to all the IS vehicles.

In next S1105, the CPU 111 waits for receiving contents of the answer BOXes (S0703) with respect to all the PT keys with respect to which service category is set to the "individual service" in the PT database 1133 from the IS vehicles 13 to which the questionnaire texts have been transmitted in S1104. When receiving the contents of the answer BOXes with respect to all that PT keys, the CPU 111 returns the processing to S1101.

On the other hand, in S1106, the CPU 111 deletes the PT key contained in the end message from the PT database 1133 in the sub-storage unit 13, and registers that the service is not being provided in the same entry as the PT key. When S1106 is completed, the CPU 111 returns the processing to S1101.

Functions of Sightseeing Guide System

Functions of the sightseeing guide system that executes the processes explained above, will be described in time-series.

<Function in Service Registration>

As discussed above, the customer 4 who has borrowed the PT 140 or the program storage medium by giving an order for the service to the travel agent 3, sets the PT 140 into his or her vehicle (a privately-owned car or a rental car), or installs the control program stored in the medium into the hardware in his or her vehicle. Then, in the case the common service was ordered, the customer 4 draws up his or her vehicle (PT vehicle 14) after the IS vehicle 13 that guides a group travel at a starting point of the group travel, and depresses the "GO" button displayed on the display of the I/O unit 144. On the other hand, when the individual service was ordered, the customer 4 draws up his or her vehicle (PT vehicle 14) after any one of the IS vehicles 13 navigating within the service area, and depresses the "GO" button displayed on the display of the I/O unit 144. Then, an application for the service registration (S0001) is transmitted to the IS vehicle 13 from the PT 140.

The IS terminal 130 receiving this application for the service registration transfers the same application to the center 11 (S0102).

The center 11 receiving this application for the service registration generates the PT key and registers it in the PT database 1133 (S0201). Then, the center 11 notifies the IS vehicle 13 of this PT key and the service category corresponding to the PT vehicle 14 which made the application (S0202).

The IS terminal 130 receiving the PT key and the service category registers the PT key and the service category in the table 1331 (S0104), and transfers the PT key to the PT vehicle 14 (S0105).

The PT vehicle 14 receiving this PT key stores the same PT key in the sub-storage unit 143 (S0003).

Further, if the service category is the common service, the IS terminal 130 transmits also the IS key to the PT vehicle 14 (S0107).

The PT vehicle 14 receiving this IS key stores the same IS key in the sub-storage unit 143 (S0005).

On the other hand, the center 11, based on the information about the PT vehicle 14 making the application that is stored previously in the PT database 1133, generates the "confirmation data for registration of PT" (S0203) and transmits the same data to the IS vehicle 13 (S0204).

The IS terminal 130 receiving the "confirmation data for registration of PT" transmits the same data to the PT vehicle 14 (S0109).

The PT 140 receiving the "confirmation data for registration of PT" displays, on the display, a content of the contract based on the "confirmation data for registration of PT" (S0007). If the customer 4 who saw the content of this contract depresses the "GO" button, the PT 140 notifies the IS vehicle of consent to the contract (S0009).

The IS terminal 130 receiving the notification of the consent transfers the notification of the consent to the center 11 (S0111).

The center 11 receiving the notification of the consent registers that the service is being provided in the PT database 1133 (S0206), and transmits a result of the judgement "OK" to the IS vehicle 13 (S0207).

The IS terminal 130 receiving the result of this judgement registers that the service is being provided in the table 1331 (S0113), and notifies the PT vehicle 14 of a start of service (S0114).

The PT 140 notified of the start of service starts the common service process (FIG. 18) if having the IS key, or starts the individual service process (FIG. 19) if not possessed of the IS key.

<Function in Service Process>

In the service process, each time the IS vehicle 13 becomes communicable with the RST 12, the IS vehicle 13 requests the center 11 to download differential parts of the CM information and of the program information, and, if its own information storage area 1331 does not contain the local information on the present district or the next district, these pieces of local information (S0303, S0403, S0405, S0406).

The center receiving this request for downloading reads the requested information from the sub-storage unit 113, and transmits the read information to the same IS vehicle 13 (S1102).

The IS terminal 13 which received the download request stores the information received from the center 11 in the information storage area 1332 (S0407). As a result, the IS vehicle 13 becomes capable of always transmitting the information about the present district and the latest CM information and program information to the PT vehicle 14.

The IS terminal 130, each time the present time reaches a preset time (set at an interval of, e.g., 10 minutes), broadcasts the local information about the present spot and some pieces of CM information and of program information to a PT vehicles 14 which is a target of the common service (S0304).

Each of the PT vehicles 14 that receives these pieces of broadcasted information and are executing the common service process, stores the sub-storage unit 143 with the information received (S0902), and displays the CM information and the front pages of the local information on the display (S0903). The displayed local information is turned over to a next page whenever the customer 4 depresses the "GO" button (S0904).

On the other hand, the IS terminal 130 individually transmits the initial information to each of the PT vehicles 14 which is a target of the individual service (S0305, S0501) while broadcasting the information to the PT vehicles 14 which is a target of the common service.

The PT 140 receiving the initial information stores the received initial information in the sub-storage unit 143 (S1002), then transmits an initial response to the IS vehicle 13 (S1003), and displays the CM information and an explanatory text on the display (S1004).

The IS terminal 130 receiving the initial response from a PT140 transmits the local information about the present spot within the present district to the same PT vehicle 14 (S0504).

The PT 140 receiving the local information successively stores the local information in the sub-storage unit 143. When completing the receipt of the local information with its quantity specified by a data size contained in the initial information, however, the PT 140 transmits an acknowledgement to the IS vehicle 13 (S1006).

On the other hand, the customer 4 in the PT vehicle 14 that is executing the individual service process is able to transmit the enquiry message in any time by depressing the "ENQUIRY" button on the display (S1008). Further, the customer 4 sets a time or position at which a preset enquiry message is automatically transmitted to the IS terminal 13 (S1014, S1017) by depressing the "SET" button on the display (S1014). The IS terminal 130 receiving the enquiry message thus transmitted, if a content of the enquiry message is a request for the information contained in its information storage area 1332, transmits the information to the PT vehicle 14 (S0307, S0606).

If the content of the enquiry message is a request for the reservation, or if the requested information is not contained in its information storage area 1332, however, the IS terminal 130 transfers the enquiry message to the center 11 (S0604). The center 11 receiving this enquiry message transmits a corresponding piece of information or the information indicating whether or not it is reserved to the IS vehicle 13 (S1103). The IS terminal 130 receiving the information transmits the received information to the PT vehicle 14 (S0606) which made the enquiry message.

On the other hand, when receiving a request for executing the questionnaire from the private research company or detecting a predetermined questionnaire execution timing, the center 11 transmits the questionnaire text to the IS vehicle 13 (S1104). The IS vehicle 13 receiving this questionnaire text transmits the questionnaire texts to all the PT vehicles 14 which are targets of the individual service (S0309, S0701).

Each of the PTs 140 receiving the questionnaire texts displays the questionnaire texts one by one on the display (S1020), then stores the answer BOX with answers to the questionnaires (S1022) inputted by the customers 4, and transmits contents of this answer BOX to the IS vehicle 13 (S1024) when the answers to all the questionnaire texts are stored in the answer BOX.

The IS terminal 130 receiving this answer BOX stores the received answer BOX as statistic information in the questionnaire database 1132, and transmits batchwise the answer BOXes to the private research company later on.

The customer in a PT vehicle 14 which is a target of the common service, when arriving at a disbanding spot with an end of the group travel, depresses the "end-of-service" button on the display. Similarly, the customer in a PT vehicle 14 which is a target of the individual service, when taking an independent action apart from the IS vehicle 13 during the trip, depresses the "end-of-service" button on the display. When the "end-of-service" button is thus depressed, the PT 140 transmits a end notification to the IS vehicle 13 (S0905, S1011).

The IS terminal 130 receiving the end notification transmits an end message to that PT vehicle 14 and the center 11 (S0311, S0801), and deletes the PT key (and the IS key) given to the PT vehicle 14 from the table 1331 (S0802).

The PT 140 receiving the end message deletes the PT key (and IS key) from the sub-storage unit 143 (S0907, S1013). Similarly, the center 11 receiving the end message deletes the PT key given to that PT vehicle 14 from a PT database 1133 (S1106). Each PT vehicle 14 is thereby excluded out of this sightseeing guide system 1.

The customer 4 in the PT vehicle 14 having such a car number with respect to which the service category is registered to be "individual service" in the PT database 1133 of the center 11, is able to find out the same or different IS vehicle 13 in the remaining itinerary of the trip, and to receive again the service from the sightseeing guide system 1 by transmitting the application for the service registration to this IS vehicle 13 (S0001).

As discussed above, according to the sightseeing guide system 1, the travel agent 3 has no necessity of making a conductor get on every sightseeing bus, for example, if applying the PT vehicle 14 to a sightseeing bus and setting the display of the I/O unit 144 in each seat. It is therefore feasible to save costs for training and personnel expenditures for a tour conductor. Further, it is possible to be supplied with the funds from the tie-up enterprises 2 by inserting CM information to the sightseeing information provided to the PT vehicles 14 and conducting the questionnaires through the bidirectional communications with the respective PT vehicles 14. Consequently, the sightseeing guide system 1 is capable of providing the services to the customers 4 at the comparatively low charge or free of charge. On the other hand, each of the customers 4 as the individual travelers is able to access the detailed sightseeing information through the PT 140. Besides, even in the individual service in a mode pursuant to a free travel in which each customer 4 is able to take an independent action, each customer 4 is able to access the sightseeing information at any time and to reserve facilities, such as the parking lot, through the IS vehicle 13 and the center 11. Accordingly, the customers 4 are able to take trips similar to their likings and nevertheless can receive more services than in the individual trip.

Note that the I/O unit 144 of the PT 140 displays the information on its display and is capable of simultaneously outputting voices of the same information (which, however, excludes the map). Further, as a mode other than inputting though the touch panel and the keyboard, the I/O unit 144 may input the voices, which utilizes a voice recognizing function.

As discussed above, according to the sightseeing guide system of the present invention, it is feasible to provide the travelers with the services through the terminal device provided in the vehicle which the each traveler get on by utilizing IVC (Inter Vehicle communication) in ITC.

While there has been described what is at present considered to be a preferred embodiment of the invention, it will be understood that various modifications may be made thereto, and it is intended that the appended claims cover all such modifications as fall within the true spirit and scope of the invention.

I claim:

1. A sightseeing guide system comprising:
   an information output terminal mounted in a customer vehicle for use by a customer; and
   an information source terminal mounted in an information source vehicle, wherein the information source terminal comprises a storage unit of the information source terminal to store information, a radio communication device of the information source terminal, and a control unit of the information source terminal for transmitting the information stored in said storage unit towards said information output terminal via said radio communication device of the information source terminal, and
   wherein said information output terminal comprises a radio communication device of the information output terminal performing radio communications with said radio communication device of said information source terminal, an output unit to output the information in such a mode that the information is recognizable by the customer, and a control unit of the information output terminal to output, via said output unit, the information received from said information source terminal via said radio communication device of the information output terminal.

2. The sightseeing guide system according to claim 1, wherein said control unit of said information source terminal transmits the information at a preset timing towards said information output terminal via said radio communication device of the information source terminal.

3. The sightseeing guide system according to claim 1, wherein said output unit of said information output terminal comprises a display visually displaying the information.

4. The sightseeing guide system according to claim 1, wherein said output unit of said information output terminal outputs audio of the information.

5. The sightseeing guide system according to claim 1, wherein said control unit of said information output terminal transmits a request for information at a preset timing to said information source terminal via said radio communication device of the information output terminal, and
   said control unit of said information source terminal, when receiving the information request from said information output terminal via said radio communication device of the information source terminal, transmits the information towards said information output terminal via said radio communication device of the information source terminal.

6. The sightseeing guide system according to claim 1, said information output terminal further comprising a position measuring device,
   wherein said control unit of said information output terminal, when its present position measured by said position measuring device is coincident with a predetermined position, transmits a request for information to said information source terminal via said radio communication device of said information output terminal, and
   wherein said control unit of said information source terminal, when receiving the information request from said information output terminal via said radio communication device of said information source terminal, transmits the information towards said information output terminal via said radio communication device of said information source terminal.

7. The sightseeing guide system according to claim 1, said information output terminal further comprising an input device,
   wherein said control unit of said information output terminal, when a request for information is inputted by a customer through said input device, transmits the information request to said information source terminal via said radio communication device of said information output terminal, and
   wherein said control unit of said information source terminal, when receiving the information request from said information output terminal via said radio communication device of said information source terminal, transmits the information towards said information output terminal via said radio communication device of said information source terminal.

8. The sightseeing guide system according to claim 1, said information output terminal further comprising an input device,
   wherein said control unit of said information output terminal transmits a request for information specified by the customer through said input device to said information source terminal via said radio communication device of said information output terminal, and
   wherein said control unit of said information source terminal transmits the specified information towards said information output terminal via said radio communication device of said information source terminal.

9. The sightseeing guide system according to claim 1, further comprising:
   a central unit which comprises a storage unit of said central unit to store all information that is storable in said storage unit of said information source terminal, a communication device performing radio communications with said information source terminal via a stationary antenna, and a control unit of said central unit transmitting the information stored in the storage unit of said central unit toward said information source terminal via said communication device,
   wherein said information source terminal further comprises a second radio communication device performing radio communications with said communication device of said central unit.

10. The sightseeing guide system according to claim 9, wherein said control unit of said information source terminal transmits a request for specified information to said central unit via said second radio communication device, and
    wherein said control unit of said central unit, when receiving the request from said information source terminal via said communication device, transmits the specified information stored in said storage unit of said central unit to said information source terminal via said communication device.

11. The sightseeing guide system according to claim 10, wherein the information stored in said storage unit of said central unit is segmented for every district,
    wherein said information source terminal further comprises a position measuring device, and
    wherein said control unit of said information source terminal transmits a request for the information on a district embracing a present position measured by said position measuring device to said central unit via said second radio communication device of said information source terminal.

12. The sightseeing guide system according to claim 8, further comprising:
    a central unit which comprises a storage unit of said central unit to store all information that is storable in said storage unit of said information source terminal, a communication device performing radio communications with said information source terminal via a stationary antenna, and a control unit of said central unit transmitting the information stored in the storage unit of said central unit toward said information source terminal via said communication device,
    wherein said information source terminal further comprises a second radio communication device of said information source terminal performing radio communications with said communication device of said central unit,
    wherein said control unit of said information source terminal, if the specified information does not exist in said storage unit of the same terminal, transmits a request for the specified information to said central unit via said second radio communication device of said information source terminal, and
    wherein said control unit of said central unit, when receiving the request for the specified information from said information source terminal via said communication device, transmits the specified information stored in said storage unit of said central unit to said information source terminal via said communication device.

13. The sightseeing guide system according to claim 1, wherein said control unit of said information output terminal transmits a request for information to said information source terminal via said radio communication device of said information output terminal, and
    said control unit of said information source terminal, when receiving the information request from said information output terminal via said radio communication device of said information source terminal, transmits the information towards said information output terminal via said radio communication device of said information source terminal in only a case where the requested information satisfies a predetermined condition.

14. The sightseeing guide system according to claim 13, wherein said storage unit of said information source terminal is previously registered with a range of the information transmittable to said information output terminal, and
    said control unit of said information source terminal transmits the requested information towards said information output terminal via said radio communication device of said information source terminal in only a case where the requested information is within a range registered in said storage unit of said information source terminal.

15. A sightseeing guide method using an information output terminal mounted in a customer vehicle for use by a customer and information transmitted from an information source terminal mounted in an information source vehicle comprising:
    storing information to a storage unit of the information source terminal;
    transmitting the information stored in said storage unit towards said information output terminal via a radio communication device of the information source terminal;
    performing radio communications with said radio communication device of said information source terminal using a radio communication device of the information output terminal; and
    outputting the information received from said information source terminal via said radio communication device of the information output terminal in such a mode that the information is recognizable by the customer.

16. The sightseeing guide method according to claim 15, wherein said transmitting occurs at a preset timing towards said information output terminal via said radio communication device of the information source terminal.

17. The sightseeing guide method according to claim 15, wherein the outputting further includes visually displaying the information received from said information source terminal.

18. The sightseeing guide method according to claim 15, wherein the outputting further includes providing audio of the information received from said information source terminal.

19. The sightseeing guide method according to claim 15, wherein said performing includes transmitting a request for information at a preset timing to said information source terminal via said radio communication device of the information output terminal, and
    wherein the method further comprises transmitting the information towards said information output terminal via said radio communication device of the information source terminal when receiving the information request from said information output terminal via said radio communication device of the information source terminal the information source terminal.

20. The sightseeing guide method according to claim 15, further comprising measuring a present position of said information output terminal to compare the measured present position of said information output terminal with a predetermined position to determine whether or not the measured present position of said information output terminal and the predetermined position are coincident;
    transmitting a request for information, when the measured present position of said information output terminal and the predetermined position are coincident; and
    transmitting the information towards said information output terminal via said radio communication device of the information source terminal when receiving the information request from said information output terminal via said radio communication device of the information source terminal the information source terminal.

21. The sightseeing guide method according to claim 15, further comprising
    inputting a request for information by a customer;
    transmitting responsive to said inputting the information request to said information source terminal via said communication device of said information output terminal; and transmitting the information towards said information output terminal via said radio communication device of the information source terminal when receiving the information request from said information output terminal via said radio communication device of the information source terminal the information source terminal.

22. The sightseeing guide method according to claim 15, further comprising specifying a request for information by a customer;

transmitting the request for information specified by the customer to said information source terminal via said communication device of said information output terminal; and transmitting specified information towards said information output terminal via said radio communication device of the information source terminal.

23. The sightseeing guide method according to claim 15, further comprising storing all information that is storable in said storage unit of said information source terminal in a storage unit of a central unit;

performing radio communications using a communication device of the central unit with said information source terminal via a stationary antenna and transmitting the information stored in the storage unit of said central unit toward said information source terminal via said communication device; and performing radio communications using a second radio communication device of the information source terminal with said communication device of said central unit.

24. The sightseeing guide method according to claim 23, further comprising transmitting a request for specified information to said central unit via said second radio communication device; and transmitting the specified information stored in said storage unit of said central unit to said information source terminal via said communication device when receiving the request from said information source terminal via said communication device.

25. The sightseeing guide method according to claim 24, wherein said storing all information further comprises segmenting for every district the information stored in said storage unit of said central, and wherein the method further comprises measuring a present position of said information source terminal;

evaluating a district in which the information source terminal is positioned; and transmitting a request for the information on a district corresponding to the position of said information source terminal to said central unit via said second radio communication device of said information source terminal.

26. The sightseeing guide method according to claim 22, further comprising:

storing all information that is storable in said storage unit of said information source terminal in a storage unit of a central unit;

performing radio communications using a communication device of the central unit with said information source terminal via a stationary antenna and transmitting the information stored in the storage unit of said central unit toward said information source terminal via said communication device;

performing radio communications using a second radio communication device of the information source terminal with said communication device of said central unit;

transmitting a request for the specified information to said central unit via said second radio communication device of said information source terminal, if the specified information does not exist in said storage unit of the same terminal; and transmitting the specified information stored in said storage unit of said central unit to said information source terminal via said communication device, when receiving the request for the specified information from said information source terminal via said communication device, aid control unit of said central unit.

27. The sightseeing guide method according to claim 15, wherein said performing includes transmitting a request for information to said information source terminal via said radio communication device of the information output terminal, and wherein the method further comprises comparing the request for information to said information source terminal with a predetermined condition to evaluating whether or not the request for information to said information source terminal satisfies the predetermined condition; and transmitting the information towards said information output terminal via said radio communication device of said information source terminal only if the predetermined condition is satisfied.

28. The sightseeing guide method according to claim 27, further comprising pre-registering a range of the information transmittable to said information source terminal; and transmitting requested information towards said information output terminal via said information source.

* * * * *